INVENTORS.
Clifton B. Graham
Irving Spiewak

ATTORNEY

May 31, 1960   C. B. GRAHAM ET AL   2,938,844
NEUTRONIC REACTOR COUNTER METHOD AND SYSTEM
Filed May 15, 1953   5 Sheets-Sheet 3

INVENTORS.
Clifton B. Graham
Irving Spiewak
BY
ATTORNEY

May 31, 1960   C. B. GRAHAM ET AL   2,938,844
NEUTRONIC REACTOR COUNTER METHOD AND SYSTEM
Filed May 15, 1953   5 Sheets-Sheet 4
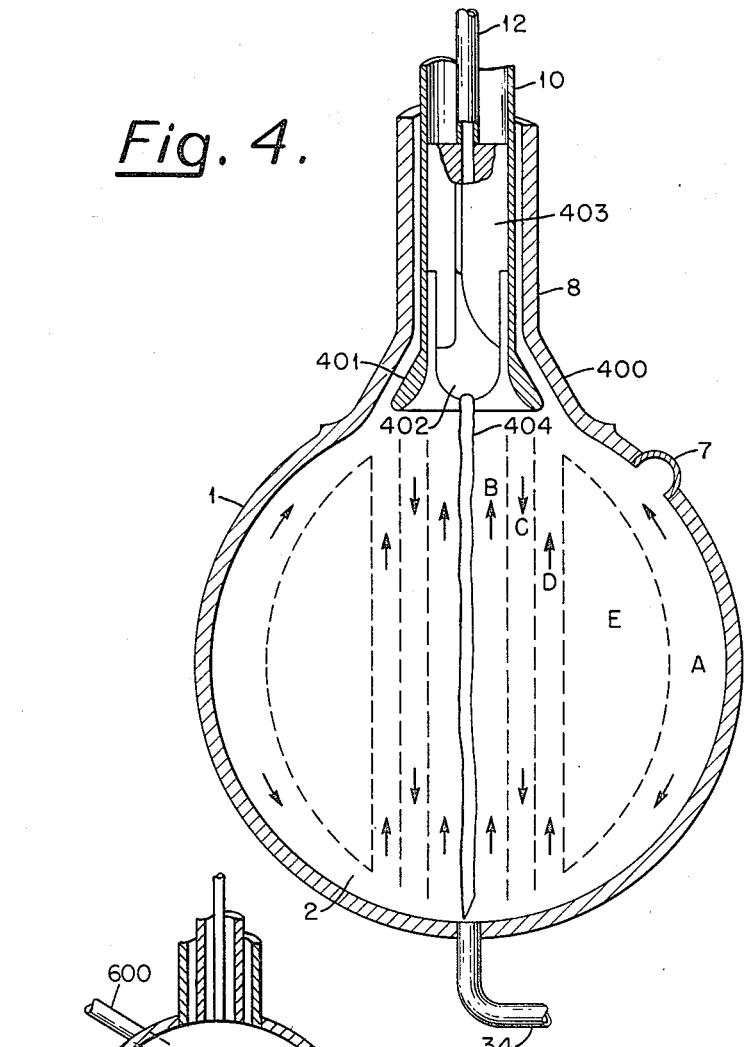
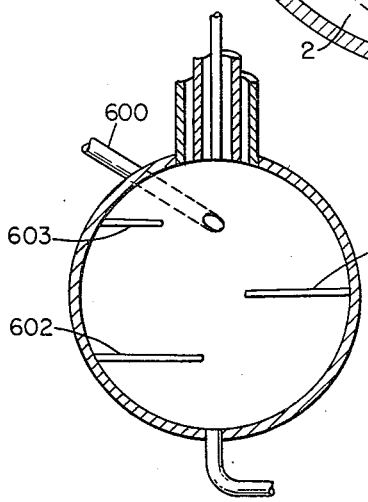
INVENTOR.
Clifton B. Graham
Irving Spiewak
BY
ATTORNEY

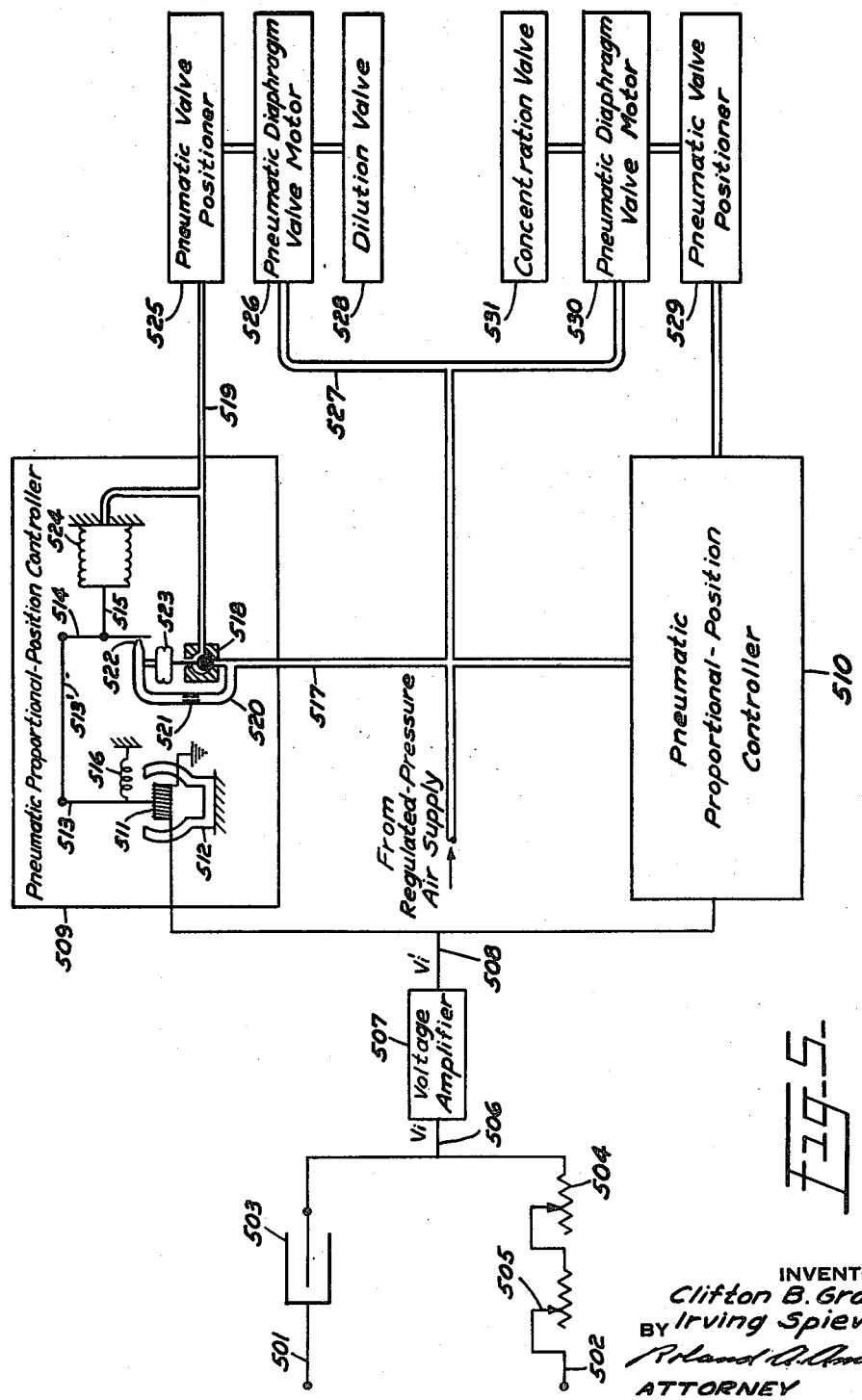

United States Patent Office 2,938,844
Patented May 31, 1960

2,938,844
NEUTRONIC REACTOR COUNTER METHOD AND SYSTEM

Clifton B. Graham and Irving Spiewak, Oak Ridge, Tenn., assignors to the United States of America as represented by the United States Atomic Energy Commission Filed May 15, 1953, Ser. No. 355,262
18 Claims. (Cl. 204—154.2)

The present invention relates in general to neutronic reactors, and more particularly to an improved method for controlling the rate of fission in a neutronic reactor employing as its principal chain fission reacting medium a substantially homogeneous liquid composed essentially of both a fissionable material and a neutron moderator.

As is known, certain particular isotopes, termed fissionable materials—prominent among which are uranium 235, plutonium 239, uranium 233, and others, and all of which, by definition, are capable of undergoing fission upon capture of a slow neutron—upon being subjected to neutron bombardment, absorb neutrons of indiscriminate energies and thereupon undergo fission. In fission, the atomic nucleus of the fissionable isotope, upon the absorption of a neutron, splits into a plurality of fragments of greater mass than an alpha particle, which splitting is accompanied by the release of a relatively enormous amount of energy and a plurality of neutrons. By virtue of the fission reaction's generating more new neutrons than it consumes, it is possible, by amassing sufficient fissionable material under appropriate conditions, to form an aggregate system capable of generating neutrons at a rate equal to or greater than that at which they are being lost to the system as the result of absorption in the system or leakage from the system, and consequently capable of maintaining a self-sustaining neutron-induced chain fission reaction. Such an amassment constitutes the essence of a neutronic reactor, and may be termed the "core" of a neutronic reactor; the mass of fissionable material sufficient to generate neutrons at a rate equal to, or greater than, loss is referred to as a "critical mass," or a "supercritical mass," respectively.

While the neutrons generated in the fission reaction are generally of quite high kinetic energy, it happens that the propensity of fissionable isotopes for absorption of neutrons leading to fission prominently increases with decrease in the kinetic energy of the neutrons, with generally the greatest susceptibility to such absorption obtaining in the instance of neutrons which are so slow as to be in substantial thermal equilibrium with the system e.g., neutron kinetic energy of ca. 0.025 electron volt at 15° C.). Accordingly, it has become customary practice in most circumstances to incorporate in the amassment a substantial proportion of a material effective in markedly reducing the kinetic energy of neutrons upon their encountering the same, without contemporaneously absorbing neutrons to any excessive degree. Such a material is termed a "neutron-moderant," and may be more precisely defined as a non-gaseous material for which the ratio $$\frac{\xi \sigma_\text{s}}{\sigma_\text{a}}$$

is greater than 10, wherein $\xi$ is the average loss in logarithm of the energy of a fast neutron per elastic collision with the material, $\sigma_\text{s}$ is the slow neutron elastic scattering cross section per atom of the material, and $\sigma_\text{a}$ is the slow neutron capture cross section per atom of the material. Through serving to decelerate the neutrons to much more effective energy levels, such incorporated neutron-moderant will beneficially afford sizeable reduction in the amount of fissionable material necessary to constitute a critical mass.

Toward further reducing the amount of fissionable material required, and toward otherwise promoting increased reaction efficiency by conserving neutrons, it is also customary in many instances to encase the chain-reacting amassment in a jacket of a material effective in reflecting otherwise-escaping neutrons back into the amassment. For reactor cores where neutrons of energy approximating thermal equilibrium preponderate, neutron-moderant materials are usually satisfactory for constituting such a neutron reflector.

Among the various practical uses of the neutronic reactor, particularly prominent is its application as a radically-advanced source of thermal power. Significantly, in fission, the specific energy content liberatable by nuclear reaction is enormous; the quantity and rate of thermal energy producible, per unit amount of fissionable material consumed, vastly surpass those producible by conventional chemical combustion. For example, in neutron-induced fission of the 235 isotope of uranium, the amount of thermal energy produced per pound of fuel consumed is of the order of 2,000,000 times that produced by aviation gasoline. Consequently, even in brisk operation as a heat source, a reactor's fuel depletion is comparatively insignificant, such that the initial charge of fuel is ordinarily sufficient to sustain the reaction indefinitely; with such a "furnace," the need for constantly replenishing the fuel is virtually eliminated. Similarly, since the chain fission reaction is inherently capable of operation at intensities on up to those orders manifested by the stellar temperatures attained in atomic bombs, the reactor as a heat source is normally adapted to operation at virtually any desired rate of energy release and temperature level that its structure and materials of construction can withstand. Furthermore, a chain fission reacting system admits of unusual compactness; especially when gross amounts of extraneous materials are excluded from the amassment, an operating reactor core may well be smaller than a few cubic feet in volume. By virtue of these attributes, the nuclear reactor has proven exceptionally promising for use as the ultimate heat source for power plants, particularly for stationary electric generating plants, and for mobile, propulsive power plants for ships and aircraft; of especial significance in mobile applications, where the afforded elimination of the need for any substantial amount of replacement fuel renders insignificant the formerly-limiting fuel capacity consideration practically limitless range of such craft may be realized.

In the development and design of reactors for such purposes, interest and effort has been directed largely along the lines of an amassment of both fissionable material and neutron moderant in solid form, through which a fluid heat-transfer medium would be passed to extract the heat generaterd. Typical of this mode of construction, the reactor core would comprise a matrix of clustered blocks of a neutron moderant in ceramic or metal form, having disposed in hollows therein a multiplicity of masses of fissionable fuel also in ceramic or metal form, through which, via a system of ducts, is passed a heat-transfer liquid or gas to practically recover the heat produced. While fully affording the aforementioned extraordinary advantages in thermal power production, such solid-core reactors have not proven unqualifiedly satisfactory for the purpose. Common among the difficulties encountered in them is the need for continual presence of a considerable quantity of heat-transfer medium, extraneous to the neutronic reaction, within the core; ordinarily, the medium not only occupies considerable space, thus adding to the necessary volume of the core, but also fruitlessly absorbs sizeable proportions of the neutrons generated—on both counts, disadvantageously necessitating considerable increase in the amount of fissionable material required to constitute a critical mass in such core. Too, being constituted of an aggregation of solid elements, such core, especially in mobile applications subject to tilting and jarring, needs considerable internal support structure—again of extraneous materials, similarly occupying valuable space and fruitlessly absorbing neutrons. Furthermore, to provide sufficient thermal force to drive the great amounts of heat generated per unit volume of core into the heat-transfer medium, it would be necessary to maintain the solid portions of the core at temperatures as much as several hundred degrees above the maximum attained in the heat-transfer stream; as a result, at such higher temperatures, serious taxing of the thermal stability of the solid core elements would result, attended by warpage, breakage, and other mechanical failures, although all the while the heat was being delivered outside the core by the heat transfer medium at a temperature unprofitably several hundred degrees lower than that at which the core operates. Another prominent difficulty regularly encountered with solid-cored reactors arises in connection with a customary periodic decontamination of the fissionable fuel. Since a number of the fission products—i.e., the fragments formed upon fission and their radioactive decay products, comprising isotopes within the range of atomic numbers of 30 to 63—are voracious absorbers of neutrons, continued self-sustenance of the neutronic reaction requires that fission product accumulation be kept at a very low level; in practice, each unit of fissionable material upon becoming sufficiently contaminated is removed, to be processed for elimination of the fission product contamination and isolation of the purified bulk of fissionable material for reuse in the reactor. Disadvantageously, for a solid-cored reactor, this normally involves either a periodic, complete shutdown and major dismantling of the reactor, or an undesirably ponderous and complex mechanism associated with the core for replacement and withdrawal of individual fissionable fuel elements as becomes necesesary while maintaining continued operation of the reactor.

For further information and details as to the theory, construction, and operation of neutronic reactors generally, and solid-core reactors in particular, reference may be made to the following sources:

"The Science and Engineering of Nuclear Power," edited by Clark Goodman, vol. 1 (1947) and vol. 2 (1949), Addison-Wesley;

"First Detailed Description of the AEC Research Reactors," in Atomics, vol. 6, November-December 1950;

and copending applications of the common assignee:

S.N. 578,278, filed February 16, 1945, in the names of Enrico Fermi and Miles C. Leverett, for A Chain Reacting System, now Patent No. 2,837,477, issued June 3, 1958;

S.N. 596,465, filed May 29, 1945, in the names of Enrico Fermi and Leo Szilard for Air-Cooled Neutronic Reactor, now Patent No. 2,836,554, issued May 27, 1958;

S.N. 194,331, filed November 6, 1950, in the name of George A. Anderson, for Neutronic Reactor, now Patent No. 2,780,596, issued February 5, 1957;

S.N. 206,592, filed January 18, 1951, in the name of George A. Anderson, for Fuel Element Loading Apparatus for Neutronic Reactors, now Patent No. 2,794,562, issued June 4, 1957.

Toward circumventing some or all of these shortcomings of the solid-core system, resort to liquid form for both the fissionable fuel and moderator has long been particularly appealing. Since both normal water and deuterium oxide (heavy water) are recognized to be superior moderants, aqueous solutions of uranium or plutonium, particularly uranium or plutonium highly enriched in one of its fissionable isotopes, have attracted sepcial interest. Beneficially, with both fissionable fuel and moderant in a single liquid solution: there need no longer be any solid in the core to warp or crack; in place of complex internal support structure, a simple tank to contain the liquids is all that is necessary; and removal and replacement of portions of the fuel for decontamination, when necessary, is simply effected by draining and adding liquids. Furthermore, heated liquid fuel-moderant from the core may be passed in substantially subcritical distribution, through an external heat exchanger for extracting the generated heat therefrom; then, the need for extraneous coolant within the core is advantageously eliminated, and the produced heat may be recovered at almost the same high temperature at which it was generated within the core.

Prior to the present invention, a number of small-scale experimental reactors, employing an aqueous solution of a sulfate or nitrate of uranium or plutonium highly enriched in one of its fissionable isotopes as their fuel-moderant, and adapted to operation at merely quite low power densities, were successfully built and operated. In these reactors, the aqueous solution generally was disposed in a tank encased in a neutron reflector constituted of beryllium oxide and/or graphite; further details are available in co-pending applications of the common assignee:

S.N. 623,363, filed October 19, 1945, in the name of Robert F. Christy, for Reactor; now Patent No. 2,843,543, issued July 15, 1958;

S.N. 751,734, filed June 2, 1947, in the names of H. C. Urey, K. Cohen, and F. T. Barr, for Improved Method and Apparatus for Producing Energy by Nuclear Fission, and, "First Detaled Description of AEC Research Reactors" (supra).

Upon thus providing a system susceptible to chain fission reaction, it becomes appropriate to interpose a means for controlling the reaction rate. In the past, for liquid core reactors, as well as solid-core reactors, such means have generally been provided in the form of the familiar rods or plates comprised of highly voracious neutron-absorbing materials, such as cadmium or boron, adapted to be adjustably inserted into the core for setting and maintaining neutron flux level, and concomitantly the rate of fission, at whatever intensity may be desired. Such rods or plates operate by manner of fruitlessly absorbing neutrons and thus preventing further contribution of those neutrons in the further propagation of the fission reaction; by partially inserting the rods or plates to just the extent necessary to precisely counterbalance the fission reaction's neutron-multiplying tendency to increase the neutron population, the neutron flux level may be maintained at a selected constant level. In practice, several such rods are ordinarily employed for the control of each reactor. At least one of these rods, which may be termed a "control rod," is normally provided with a constant-acting, high-speed, electro-mechanical drive adapted to continuously readjust automatically the exact degree of insertion of the control rod in response to the vagaries of the often-quite-unstable neutron flux level, as measured by provided radiation-determination instrumentation. As for the remainder, normally termed "shim" and/or "safety" rods or plates, the former, "shim" rods, are usually responsive to manual control and are employed in effecting gross changes in the neutron-flux and fission-rate levels, such as at start-up and shutdown of the reactor, while the latter, "safety" rods, are usually maintained in a cocked condition, automatically-releasable for instantaneous insertion into the interior of, or into very close proximity to, the reactor core, to shutdown and terminate the fission reaction immediately and automatically in the event that it would tend to run-away out of control. For further details concerning the design and operation of such conventional reactor control systems, reference may be made to companion applications of the common assignee:

S.N. 382,498, filed August 20, 1953, in the name of Henry W. Newson, for Neutronic Reactor Control Element; and S.N. 357,216, filed May 25, 1953, in the names of Henry W. Newson et al., for Overall Control System for High Flux Pile.

This conventional method of control, although it has unquestionably proven successful and reliable in controlling most of the neutronic reactors in this country over the course of the last decade, is nevertheless not unqualifiedly satisfactory for the purpose. A particularly prominent shortcoming in the case of the "control" rods or plates, which are employed to fruitlessly absorb sizeable quantities of neutrons throughout all periods of operation of the reactor, is that such procedure entails serious in-economy of fissionable material; simply, the continual dissipation of fission-produced neutrons represents a sheer extravagant waste of scarce and extremely valuable fissionable material. Another drawback, of graver concern from an engineering standpoint and which manifests itself especially in the case of "control" rods which are inserted into the interior of the core itself, is the pronounced irregularity and non-uniformity in distribution of neutron flux, and concomitantly of fission-reaction rate, throughout the core, caused thereby. More particularly, the presence of a control rod or plate in the core produces in its immediate proximity a marked local dip in neutron flux in the core. In nuclear power production this non-uniformity becomes generally undesirable, for reason that the torpidity of the fission reaction in the vicinity of the absorber rod or plate shifts the burden of power production largely to the more distant regions of the core, with local excessive overheating and attendant thermal damage and difficulties in those distant regions consequently ensuing. Furthermore, this non-uniformity becomes specifically undesirable in the case of liquid-solution-core reactors, in that it serves to adversely aggravate those oscillations and fluctuations in reactivity throughout the core which stem from radiation-induced decomposition of the solvent into gaseous decomposition products with consequent evolution of the same as bubbles rising through the liquid core. In more detail on this point, in the aqueous solution form of reactor core, as an adjunct to the fission reaction the water content in the core is progressively decomposed into principally hydrogen and oxygen gases—as well as a small amount of hydrogen peroxide—as a result of the intense ionization produced by the radioactive emanations and fission fragments emitted upon each fission. The magnitude of the resultant gas evolution is by no means insignificant; in operation of an aqueous-solution-core reactor at a power generation rate of 1000 kilowatts and at atmospheric pressure, so much as several liters per second of gas would be evolved. Gas formation and bubbling of such magnitude directly within the critical amassment greatly detracts from general controllability of the reaction; the gas bubbles would tend to displace much of the fuel solution from the core tank toward rendering the amassment subcritical and inoperative, and if a core tank sufficiently larger to accommodate a critical amassment of fuel solution despite the bubbling were substituted, the resulting system would be susceptible, upon any momentary subsidence in the bubbling, to exceeding the bounds of all reasonable control means so as to run away in a perhaps catastrophic, uncontrolled neutronic fission reaction—uncondonably, a violent and erratic careening of the reaction between inoperative subcriticality and calamitous excessive supercriticality. As an added hazard, the evolved gas is, in itself, explosible, and thus endangers the entire reactor and its gas discharge system. In practice, toward mitigating this difficulty, maintaining the chain reacting solution under high pressure has been found not only to compress the evolved gas volume, thereby lessening the magnitude and violence of the displacement of fuel solution in the core, but also to promote a modest extent of recombination of the gases back into water. Likewise, various catalytic and combustion techniques for effecting controlled recombination of the gases, toward reducing the explosion hazard, have been devised and developed. Nevertheless, although the severity of the action can thereby be subdued, substantial bubbling still persists. Particularly objectionable, the generated gas bubbles take random and erratic paths in their gradual rise to the surface of the liquid, which results in local non-uniformity, and non-symmetry in distribution of fissionable material, with concomitant like local unbalance in the distribution of the rate of fission reaction. This effect becomes especially serious in view of the lingering rate of ascent of the bubbles, which represents a protracted residence time for each bubble in the solution. The aggregate effect is deleterious oscillation in the rate of reaction throughout the core, and as a result large and rapid fluctuations in the overall rate of fissioning. Furthermore, in rising, the liquid-displacing bubbles progressively gain the company of other bubbles at each higher level, and thus increase in number toward the top; this results in a non-symmetrical overall distribution of fissionable fuel, with the degree of non-symmetry varying with the overall rate of reaction—a condition which further contributes to oscillation and fluctuation of reactivity. Now, upon superimposing upon all of this, one or more local dips in the neutron-flux and fission-reaction rate through insertion of neutron-absorbing control rods into the core, water-decomposition and bubble production in the locality of the absorber becomes much less than in other regions of the core, resulting in further substantial non-symmetry and in turn aggravation of deleterious oscillation and fluctuations in reactivity throughout the core. Other drawbacks to controlling reactors by means of such absorber rods and plates arise from the frequent necessity of having at least part of a mechanical control rod drive mechanism directly within the core itself, and thus exposed to the full fury of the radiation therein. It is highly important that such mechanism be substantially failure-proof; yet, its moving parts normally require essential lubrication, and it has been experienced that, upon neutronic reactor irradiation, direct exposure within the core induces rapid viscosity increase in conventional lubricating oils often to the extent of failure-producing thickening in a very short itme—as is discussed more fully in companion applications of the common assignee:

S.N. 380,147, filed September 8, 1953, in the names of R. O. Bolt, J. G. Carroll, F. A. Christiansen, G. H. Denison and J. W. Kent, for Method of Inhibiting Irradiation-Induced Viscosity Increase of Organic Fluids, and applications cross-referenced therein.

Consequently, there has been an increasing desire that new and effective reactor control means be found for avoiding and overcoming these shortcomings, especially for application to reactors employing fuel in aqueous liquid form, being operated at appropriately high heat generation rates for practical power production.

Accordingly, one object of the present invention is to provide a new and improved method for controlling the rate of fission in a neutronic reactor employing fissionable fuel and moderant in liquid form.

Another object is to provide a new and improved fuel-containing system for such a reactor particularly adapted to implement such a method.

A further object is to provide such a method and system especially suited to afford such improvement where the fissionable fuel and moderant are in aqueous solution form.

Still another object is to provide such a method and system to afford an improved neutronic reactor of such type, of appropriate fitness and suitability for practical-scale power production.

Still a further object is to provide such a reactor suitable for economic and convenient fabrication, in a large measure, from conventional steam-plant, and chemical-processing vessels, apparatus, and plumbing, available in standard stock on the market.

Additional objects will become apparent hereinafter.

In accordance with the present invention, for controlling the rate of fission in a neutronic reactor comprising, as its principal chain fission reacting medium, a substantially homogeneous liquid composed essentially of a fissionable material and a neutron moderant, disposed in a substantially volumetrically-constant amassment and adapted to engage, while so disposed, in spontaneous, self-sustaining chain fission reaction, a new and improved method comprises circulating said liquid as a constantly-flowing stream through a continuous closed path and at one point in said path passing the liquid through such state of amassment, at another point in said path continuously retaining apart from the circulating liquid a variable proportion of the total amount of one of its original constituents selected from the group consisting of its fissionable material and its moderant, removed from the circulating liquid substantially preferentially with respect to the unselected other said constituent, and altering said variable proportion of preferentially-retained constituent, thereby altering the concentration of mass of fissionable material per unit mass of moderant in said circulating liquid, and consequently thereby serving to adjust the reactivity of the amassment to a different value. In the preferred mode of operation said substantially homogeneous liquid is in true solution form, wherein the fissionable material is its solute and the moderant its solvent; in such case, in effecting the instant new and improved method, it is either the solute or the solvent that is continuously retained apart in variable proportion, and in altering said variable proportion of preferentially-retained constituent it is the molal concentration of the circulating solution that is thereby altered. In so continuously retaining apart a variable proportion of either the fissionable material content or the moderant content of the original solution, as a concentrate or in pure form, the molal concentration of the circulating fuel-moderant solution becomes dependent upon the magnitude of the proportion retained. For instance, the absence of a removed portion of solvent from the circulating solution causes the solution to possess a molal concentration commensurately greater than that of its original solution, with the solution becoming somewhat more or somewhat less concentrated upon any increase or decrease, respectively, in the variable proportion of removed solvent retained apart from it. Similarly, the absence of a varying proportion of solute results in correspondingly lower solution concentrations, in the same way. Thus, by continuously retaining apart an appropriate proportion of the solute or solvent, the molal concentration of the circulating solution is maintained at any desired value, and is readily altered to a different desired concentration, through further preferential removal of, or return of amounts of the particular constituent being retained. By so continuously regulating the concentration of the circulating solution being continually passed through the state of chain-reactive amassment, control of rate of fission in the amassment is accomplished through the concurrence of two simultaneous mechanisms. First of all, by virtue of the particular restriction that the amassment should have a substantially constant volume, so altering the molal concentration alters the mass of fissionable material in the core and in turn tends to alter qualitatively directly the degree of reactivity toward chain-fission of the amassment; increase in concentration, serving to increase mass of fissionable material tends to increase reactivity, and vice-versa. Simultaneously, such altering of molal concentration represents alteration of the proportionation of moderant to fissionable material in the solution, which results in alteration of the mean energy of the neutrons in the core, and consequently the propensity of those neutrons for being fruitfully absorbed by the fissionable material, and in turn tends to alter qualitatively inversely the degree of reactivity of the amassment; increase in concentration, serving to decrease the proportionation, to increase mean neutron energy, and decrease the propensity, tends to decrease reactivity, and vice-versa. In the usual case of conventional thermal neutronic reactors, which are characterized by mean neutron kinetic energies relatively closely approaching that of thermal equilibrium with the system, the first effect will preponderate, such that the additive result there is predominantly a variation of fission reactivity qualitatively directly with the change in molal concentration effected by the continuous retention of a proportion of solvent or solute, modified by a subordinate counteractive variation in reactivity due to the latter effect. Accordingly, by so continuously retaining a variable proportion of solvent or solute and altering the magnitude of the retained proportion in the direction appropriate in accordance with the foregoing outline, reaction rates which commence to stray above or below the desired operating level may readily be returned to the proper level, and otherwise the reaction rate may be altered to any other level as may be desired, thereby affording continuous control over the course of the reaction.

Most advantageously, in establishing control in this manner, no quantities of voracious neutron absorbers for wastefully dissipating neutrons in the core are necessary. Too, this method of controlling affects the entire core uniformly, so that adverse pronounced local dips in neutron flux and reaction rate are not incurred. Furthermore, reactor control in this manner is pre-eminently suited for application to a fundamentally-advanced neutronic reactor operational system which has been contemporaneously devised for substantially mitigating and overcoming the difficulties of bubbling of gaseous radiation-induced decomposition products in aqueous solution in the cores, and is described in companion patent application of the common assignee:

Application S.N. 321,078, filed November 18, 1952, in the names of Charles E. Winters, et al., for Improved Neutronic Reactor Operational Method and Core System.

Said advanced method specifically involves maintaining the fuel-moderant solution, while within the state of chain-reactive amassment, in rotational flow about a principal axis of the amassment at a sufficient velocity to provide a vortex, and discharging evolved decomposition-product gas as it bubbles to, and concentrates within, the cavity of the vortex; maintenance of such vortical rotation requires the absence of substantially-flow disruptive internal obstructions, whereupon the instant method's feature of avoiding all need for inserting and disposing control rods and the like within the interior of the amassment is signally advantageous. Moreover, such reactor control method has proven eminently successful in practice as incorporated in a full scale prototype reactor adapted to serve as the ultimate power source of an electric generating plant, utilizing a circulating aqueous $U^{235}$-enriched uranyl sulfate solution, adapted to operate at a temperature of ca. 250° C., a pressure of 1000 p.s.i., and a reactor operational rate of 1000 kw. By having achieved successful operability, and by providing its substantial advantages, the present control means clearly represents a significant improvement in the design and operation of neutronic reactors.

In the present method, a variety of specific techniques for preferentially removing and continuously retaining a variable proportion of the solvent or solute of the circulating solution are available. For instance, for preferentially removing the fissionable material solute from the circulating solution, conventional aqueous-organic solvent extraction procedures would be applicable. Where the circulating solution is aqueous, such procedures, through continuous contact of the solution with certain water-immiscible organic solvents, afford preferential extraction of the dissolved uranium or plutonium values into the organic phase, whereupon the extracted fissionable material may be caused to return to the circulating solution by altering important conditions such as oxidation state of the fissionable material and/or acidity of the solution, and thereupon recontacting the organic extract with the circulation solution. Similarly, if the circulating solution is organic, opposite procedures of stripping fissionable material by contacting with aqueous solution, and subsequently recontacting the resulting aqueous solution under different conditions with the circulating organic solution to return fissionable material to the same are available. For example, eminently effective solvent extraction procedures of this nature are taught and outlined in copious detail in co-pending applications of the common assignee:

S.N. 303,691, filed August 11, 1952, in the names of Thomas C. Runion et al., for Process for Separation of Plutonium, Uranium, and Fission Product Values; and S.N. 303,692, filed August 11, 1952, in the names of Charles V. Ellison et al., for Process for Segregating Uranium from Plutonium and Fission Product Contamination.

As shown in those applications, tri-n-butyl phosphate diluted with a hydrocarbon approximating kerosene to about 15–30% by volume is highly efficient in extracting tetravalent plutonium nitrate or uranyl nitrate from aqueous nitric acid solutions; however, distribution coefficients strongly favoring return of plutonium to the aqueous phase obtain upon simply imposing reducing conditions appropriate for converting the plutonium to the trivalent oxidation level, and distribution coefficients strongly favoring return of the uranyl nitrate to the aqueous solution obtain upon simply neutralizing the nitric acid content of the aqueous solution and optionally adding a little sulfuric acid thereto to form an aqueous-soluble complex with the uranium values. The technique found particularly preferable, though, which is applicable generally in the usual situation where the vapor pressures of the solute and solvent are substantially different, involves preferential removal of the more volatile solvent by partial distillation of the circulating solution, and continuously retaining apart a varible amount of the distillate or distilland. Distillation is rapid, and is ofttimes highly preferential since the distillate usually represents substantially pure solvent; return of any amount thereof to the circulating solution as becomes desirable is conveniently effectible by merely re-admixing the same into the passing stream of solution. This preferred distillation procedure has proven especially effective where at least a part of the stream of solution circulating external the chain-reactive amassment is subjected to continuous partial distillation, whereupon, after an initial accumulation of an appropriate proportion of the distillate for continuous retention apart from the circulating solution, the resulting continuous stream of distillate is, for the most part, uneventfully returned immediately and re-admixed into the flowing stream; the continuously returning stream of distillate, though, is instantaneously divertible in whole or in part to the retained accumulation in order to immediately increase the concentration of the circulating solution, while, on the other hand, the molal concentration of the circulating solution may be immediately reduced by directly draining distillate from the accumulation into the flowing solution. Beneficially, not only is control of solution concentration and thus the rate of fission reaction in this way especially rapid, but it is especially simple as well, since all control regulation is executed merely by manipulation of two valve means, one for effecting said diversion and the other for effecting said draining. Such valve means may be adjusted manually, or by automatic actuating means responsive to radiation-determination instrumentation, whichever is the more convenient depending upon the degree of instability in reaction rate of the particular reactor system to which it is applied. Naturally, in any such procedure, all portion of solution not within the chain-reactive amassment should be disposed and restricted in geometric configurations of sufficiently slender girth as not to admit of self-sustenance of chain fission reaction in those external regions; this applies especially to those portions being retained as a separate accumulation in accordance with the instant method, as well as to those portions flowing in any part of the closed path other than the amassment.

Likewise, the particular constitution of the chain reacting system to which the instant control method is applied is similarly subject to considerable variation. Generally, any reactor system employing, as its principal chain fission reacting medium, a homogeneous liquid constituted of a fissionable material and a neutron moderant, may be benefited. Such benefit extends to systems using solutions of fissionable materials, normally in the form of compounds of $U^{235}$, $Pu^{239}$, or $U^{233}$, dissolved in either inorganic and organic liquid neutron moderants. Many organic liquids, notably hydrocarbons, are both effective solvents for the fissionable material and able moderants in view of high hydrogen and carbon content; a goodly proportion of these are highly volatile and easily separated from the fissionable-material solute by distillation, and thus are especially suitable here. The instant method has proven particularly advantageous in cases where the fissionable material material is in an aqueous solution or deuterium oxide solution form, wherein the water or deuterium oxide content serves as the principal neutron moderant. There, it is usually desired that the solution be constituted of a proportion of water or deuterium oxide sufficiently great to thoroughly attenuate the kinetic energy of the neutrons generated in the fission reaction such that the average energy level of neutrons in the core closely approximates that of thermal equilibrium at the ambient temperature. For this, molar ratios of water, or deuterium oxide to fissionable isotope greater than the order of 100 to 1 are appropriate, with the range of about 250–1000:1 being particularly preferred; the latter would amount to solution concentration of ca. 10–50 grams $U^{235}$ per liter. While these concentrations are of quite low fractional molarity, actual solution concentrations necessary to achieve them will be considerably greater where the fissionable isotope is associated with other non-fissionable isotopes of its polyisotopic element— for example, $U^{235}$ only partially freed of associated $U^{238}$. Furthermore, with manifold isotopic dilutions, solubility considerations unobjectionably often necessitate even greater ratios of water to fissionable isotopes—for example, with deuterium oxide solutions of natural uranium, comprising only about 0.7% $U^{235}$, molar ratios of $D_2O$ or water: $U^{235}$ within the higher range of 1,000–10,000:1 become necessary merely to effect complete dissolution. For constituting the solution, the fissionable material should best be in compound form, more particularly, in the form of a uranium or plutonium compound of high solubility and of staunch resistance to the heat and radiations to be encountered, and one which does not contribute components either excessively absorptive of neutrons or susceptible to intense radioactivation. Satisfactory in these respects are uranyl and plutonyl sulfates and nitrates. The volume of amassment of fuel solution appropriate to enable the instant concentration control method to cause the amassment to be critical at an adjusted concentration within the aforesaid preferred ranges varies with the parameters generally affecting the rates of consumption and loss of neutrons from the amassment, e.g. geometry of the core container, specific composition and nuclear properties of the solution, effect of solution impurities, the presence and relative volume of any voids within the amassment, identity of material of core container and other materials proximately surrounding the amassment, and the like. Such volume is quite accurately calculable, though, on the basis of known and accepted nuclear engineering theory; typically, for example, for a spherical core geometry, and a fuel solution comprising aqueous uranyl sulfate approaching isotopic purity in $U^{235}$, an amassment of about 1½ to 2 feet in diameter would be adequate, while for uranium of natural isotopic constitution dissolved in deuterium oxide, an amassment of about 35 to 40 feet in diameter or more would be needed. Toward further minimizing the necessary volume of the amassment, it is preferred to jacket the same in a neutron reflector; several inches or so of an efficient neutron moderant such as graphite, beryllium oxide, beryllium metal, deuterium oxide, or water is well suited. Use, in addition to the instant method of reaction control by continuous retention of solute or solvent, of other reaction control means, particularly "shim" and "safety" rods, is not objectionable, and may supplement the instant control method so as to afford even further flexibility, and added safety, of operation. Other features important to practicality may include heat-transfer means for extracting useful power generated by the reactor, preferably comprising an external heat exchanger through which the heated fuel-moderant solution may be passed upon leaving the reactor core.

Particularly, in the interest of coping with the inherent tendency of chain-fission-reacting systems, in view of their neutron-self-multiplication characteristic, toward engaging in rapid exponential increases and decreases in reaction rate, it has further been found that by operating liquid-core reactors in accordance with the present method a propitious self-stabilization effect in this regard may normally be realized. That is, such inherent tendency customarily proves considerably troublesome in most other types of reactors and reactor operations, so much so as to necessitate the use of constantly-acting, high-speed, failure-proof radiation-responsive control actuating mechanism. However, in operation in accordance with the present method, by virtue of its requirement of constant volume of the chain-reactive amassment, such instability is substantially mitigated and largely overcome, particularly where pressure of the solution is maintained constant as well. Serving as the basis for this, generally about all liquid fuel-moderant solutions appropriate for use in a liquid-core reactor encountered in practice have positive coefficients of expansion under the conditions at which they are to be employed. Furthermore, one of the products of the chain-fission reaction is heat in the solution itself; therefore, in the event of excessive reaction rate the solution in the amassment simultaneously tends to overheat, or, on the other hand, to fall in temperature in the event of a decrease in reaction rate. Consequently, upon so maintaining volume and pressure of the solution of the chain-reactive amassment constant any increase in reaction rate will tend to increase the temperature of the solution, causing it to expand, resulting in the displacement of a commensurate proportion of the fuel solution from the amassment, whereupon the consequent decrease in fissionable material content serves to lessen the degree of chain reactivity; in the event of a decrease in reaction rate, the ensuing occurrence is vice-versa. Furthermore, while this effect occurs to a practicable degree at low temperatures approximating room temperature, it becomes especially accentuated and pronounced at elevated temperature ranges on up to those closely approaching the critical temperature. For instance, the critical temperature of water is 374° C., and the critical points of aqueous solutions of inorganic salts of fissionable material—in the absence of thermal decomposition or phase changes—are roughly of the same order. Accordingly, it is frequently desirable to operate at temperature ranges so high in approaching this general level as other considerations will permit, in order to realize maximum effectiveness of this self-stabilizing effect. In the case of aqueous solutions of fissionable materials, 200 to 300° C. may often be employed without incurring thermal decomposition or phase change, or exceeding the critical temperature. In order to keep the solution in liquid state in any event, and particularly when so operating at highly elevated temperatures, it becomes important that pressures appropriately elevated to prevent boiling of the solution be employed; including reasonable margins of excess pressure, constant pressures as high as 1000 p.s.i. and above are in order where employing aqueous solutions in the 200–300° C. range. Also, the important expansion and contraction of solution from the constant-volume amassment is effectively afforded by providing in the solution flow-path at a station external the amassment a pressure-tight expansion chamber of ample proportions and substantially unimpeded communication with the solution in the chain-reactive amassment. With this arrangement, expansion results merely in the displacement of a proportion of the solution from the amassment, attended by a rise in level of the solution in the expansion chamber, and vice-versa; the solution is pressurized by maintaining an appropriate constant pressure of gas or vapor above the liquid level in the expansion chamber. Thus, in such practice of the present method, since temperature changes and consequent thermal expansion and contraction occur virtually instantaneously in response to changes in rate of a chain reaction, this self-stabilizing effect is particularly effective in curbing the tendency of the reaction rate to run away in either direction, thereby providing ample time for any desired alteration of the proportion of separately-retained solvent or solute to be made for effecting correction or otherwise altering the degree of reactivity of the amassment.

As alluded to above, the instant method is especially advantageous when applied to liquid-core reactors wherein the chain-reactive amassment is maintained in vortical rotation, in accordance with the invention of cross-referenced companion application S. N. 321,078. In more detail, such procedure is effective in substantially mitigating and overcoming the frustrating difficulties arising from bubble evolution within the liquid amassment. In simplest terms, the liquid in said amassment is maintained in rotational flow about a principal axis thereof at a sufficient velocity to provide a vortex, and evolved gas is discharged as concentrates within the cavity of the vortex. In establishing such a vortex, the fissionable-fuel-containing liquid in the amassment, upon being maintained in rapid axial rotation, is thrust outward toward the periphery of rotation by the resulting centrifugal force, and accordingly tends to vacate and form a cavity along the axis of rotation; thereupon, evolved gases, by virtue of their low density, are centripetally displaced toward the axis and into such cavity, from where the gases may be discharged as they concentrate. Importantly, upon such vigorous rotation, supergravitational fields many times that of normal gravity are centrifugally established. Under the correspondingly intensified influence toward centripetal bubble displacement concomitant to such fields of force, the bubbles of evolved gas, instead of lingeringly and wanderingly rising through the liquid, are caused to dart swiftly to the cavity; as a result, the comparable amount of gas dispersed in the liquid at any one time is markedly decreased, and erratic and fluctuating non-uniformity in fissionable material distribution is effectually minimized. To the same end, for a given general amassment, the distance through the liquid body each bubble must traverse is only a fraction of that in a quiescent tank, thus serving to further reduce the residence time of the bubbles in the liquid. Moreover, since all bubble migration is toward the central axis, overall non-symmetry of fissionable material distribution through the amassment is eliminated, thereby doing away with the associated conditions favorable to initiating and sustaining oscillatory fluctuations in fission rate throughout the amassment. For establishing and maintaining such vortex, the particularly preferred technique comprises maintaining liquid rotation by tangential introduction and axial discharge of a continuous stream of the fuel-moderant solution through an internally-unobstructed closed core container having an internal geometry of revolution about a principal axis. Such container means for the rotating chain-reactive liquid amassment appropriately includes liquid-inlet duct means communicating substantially tangentially with the interior of said container, means defining a gas outlet substantially axially concentric with, and at an axial extremity of said container, and means defining an annular liquid-outlet port substantially axially concentric with, and at the same extremity of said container as, and surrounding, said means defining a gas-outlet port. Beneficially, from a hydrodynamic standpoint, the actions of both the tangential introduction and the axial discharge of the liquid solution each complementarily contribute to maintaining the vortex in motion; furthermore, the axial gas-outlet port will register naturally with an extremity of the cavity of the resulting vortex thereby affording separate discharge of evolved gas as it concentrates within the cavity. While closed cylinders, and prolate and oblate spheroids are suitable as the internal geometry of such core container, the sphere is the choice configuration, not only in that it provides an ideal geometry for stability of the vortex, but also, from the neutronic reaction standpoint, it affords the optimum geometry for minimizing the mass of fissionable material required for criticality. In practice, application of such vortical rotation, by virtue of its forcefully regimenting the encountered gas-evolution into a steady and stable effect, as well as sharply curtailing residence time of bubbles in the amassment, substantially extends upward the specific power generation rates at which liquid reactors may practically be operated; this is especially true when the same is employed in conjunction with pressurization and similar prior means for counter-acting the bubble problem. When application of the instant method of reaction-rate control by continuous retention of a variable proportion of solvent or solute superimposes upon all of this its distinctive benefits, liquid reactor operation well into the range of practical power production rates is liberally afforded.

A more comprehensive and detailed insight into the present method and means is afforded by consideration of the specific operations and equipment preferred by applicants. While practice of the present invention in accordance with the foregoing general outline is not limited to any specific design of neutronic reactor, or continuous retention device, the systems illustrated in the appended drawings, particularly the overall installation shown in Figures 2, 3, and 4 thereof, have proven to be eminently efficacious for the purpose.

In the drawings:

Figure 1 is a diagrammatic sketch of fundamental apparatus arrangement for effecting the present method by employing the preferred procedure for preferentially removing solvent comprising continuous partial distillation of the circulating solution.

The next three Figures, 2, 3 and 4, set forth, in copious detail, an extensively developed specific embodiment of a reactor system wherein the present control method is integrated, again employing continuous partial distillation of separately retainable solvent for the purpose, in much the same manner as outlined in Figure 1. More particularly:

Figure 4 is a further enlarged cross-sectional illustration showing the internal details of the core-tank employed in the Figure 2–Figure 3 system.

Figure 5 is a semi-schematic diagram of radiation-responsive actuating instrumentation applicable to continuous automatic regulation of solution molality by means of the continuous partial distillation system set forth in Figure 1, and optionally applicable similarly to the nuclear power plant of Figure 2.

Figure 2:
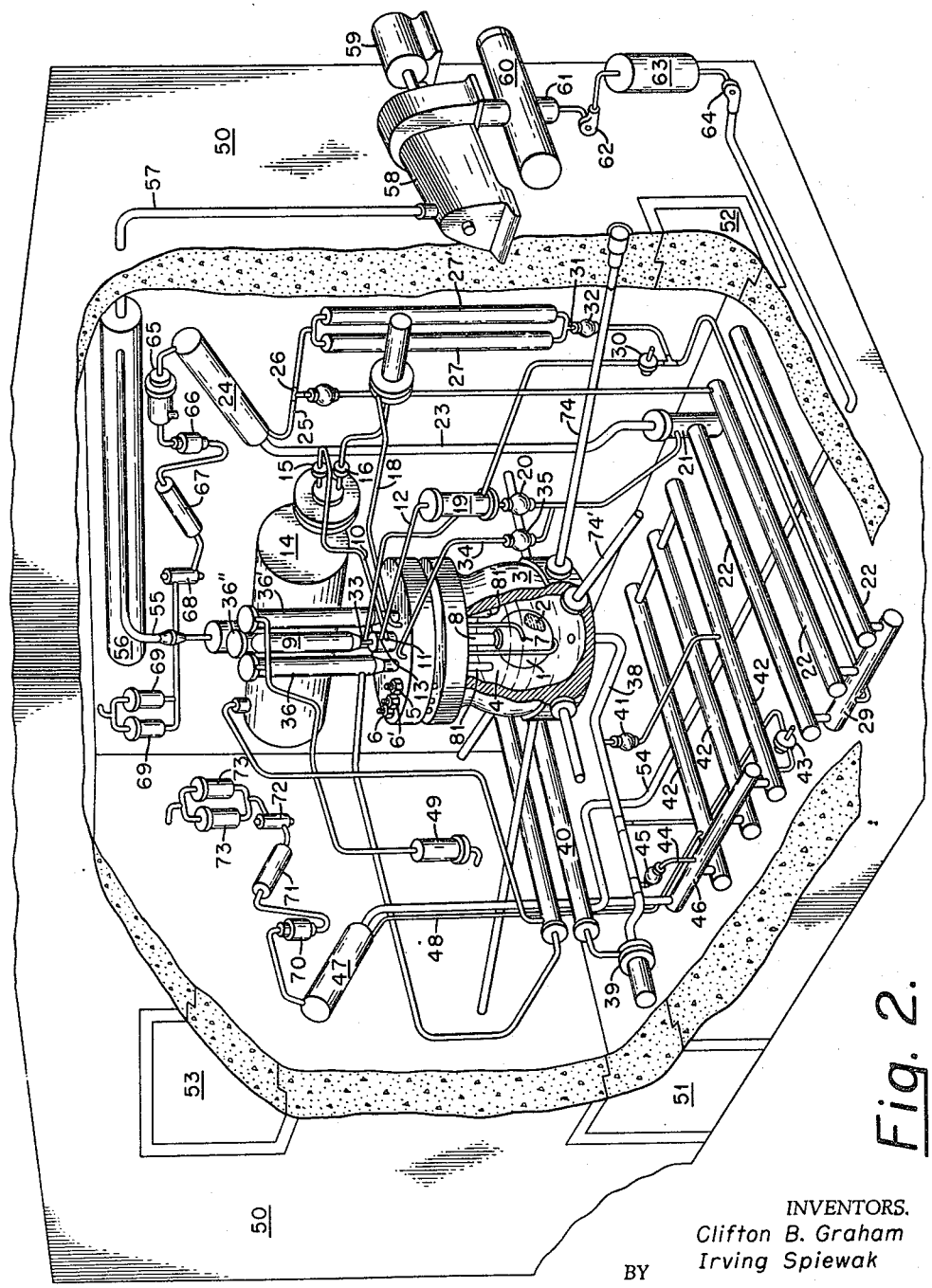
Figure 2 is an overall assembly illustration of a circulating liquid solution fuel reactor adapted to operation and embodying means in accordance with the present invention, together with electric generating equipment deriving its power therefrom, which altogether constitutes an integral self-contained electric generating plant.
Figure 3:
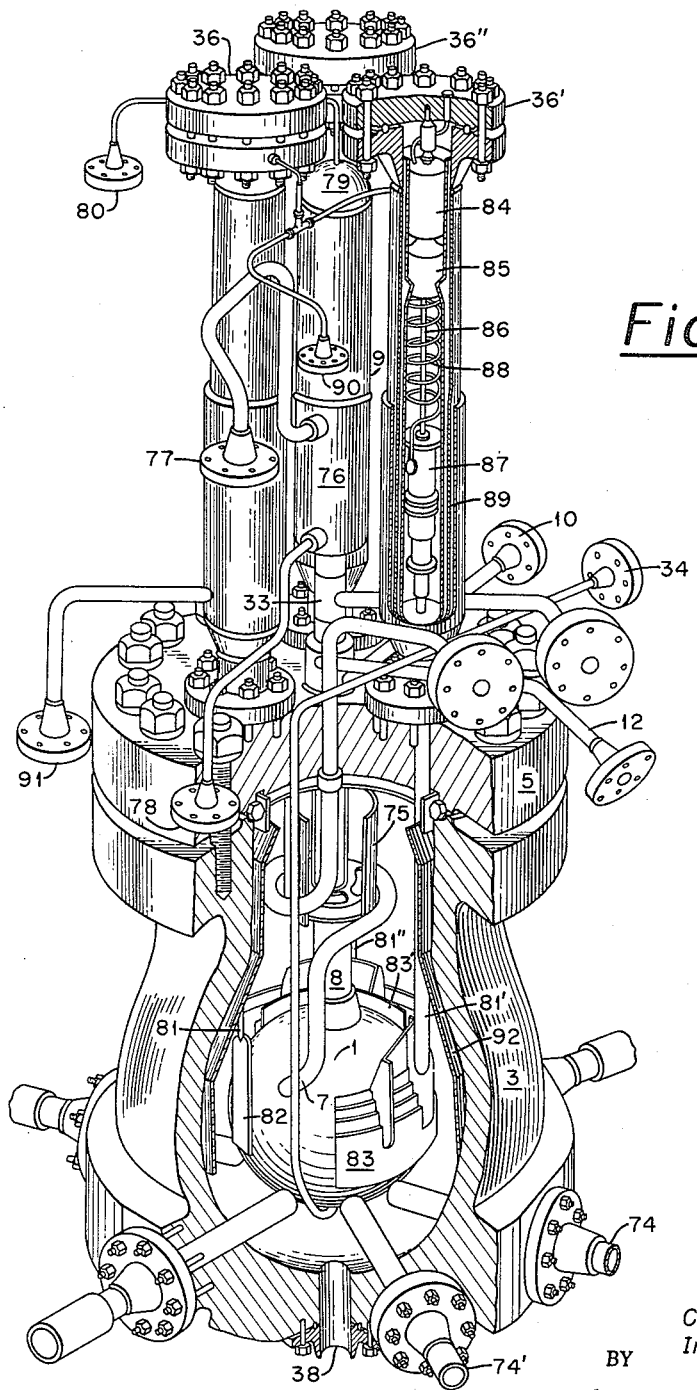
Figure 3 is an enlarged cross sectional illustration, in greater detail, of the core-tank sub-assembly of the Figure 2 reactor.

Figure 6 diagrams an optimum arrangement of optional special baffles for promoting advantageous liquid mixing within a core tank as employed in the Figure 2–Figure 3–Figure 4 system.

Figure 1:
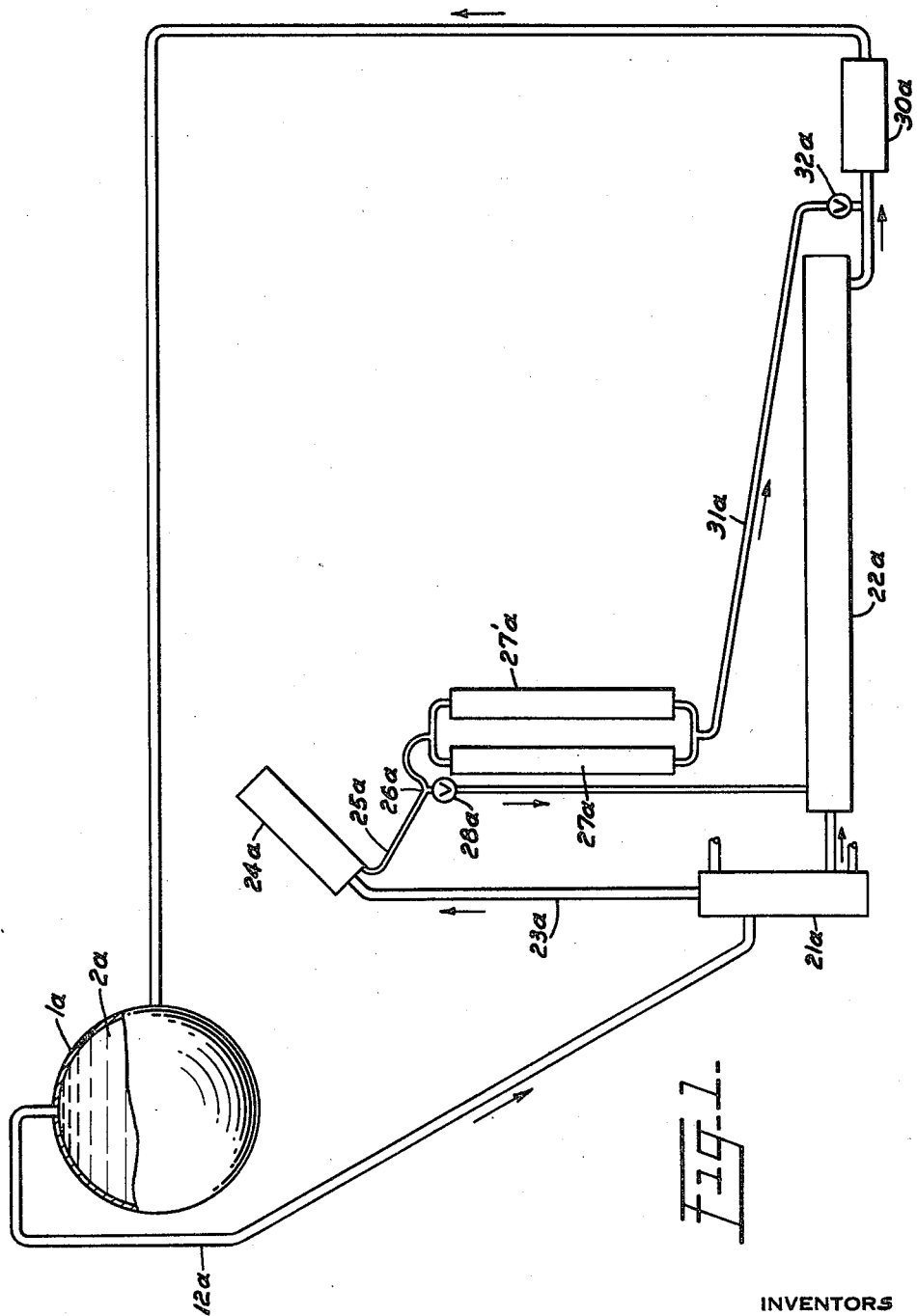

Referring to the basic apparatus arrangement regardable as elementary to conducting the present method by employing the preferred partial-distillation procedure, outlined in Figure 1, a closed container $1_a$, adapted to confine a chain reactive amassment of an aqueous solution $2_a$, comprising a fissionable material as the solute dissolved in water, flowing as a continuous stream therethrough, communicates at its top with a solution outlet pipe $12_a$, which leads into a continuous steam-heated evaporator $21_a$. The evaporator $21_a$ discharges from near its bottom into a slender-girthed solution storage tank $22_a$; from the top of the evaporator, a vapor line $23_a$ leads upward into a condenser $24_a$. From the condenser, a condensate drain line $25_a$ descends to a T $26_a$, where it forks into two branches, one branch leading via a slight rise into a pair of condensate tanks $27_a$, $27'_a$, while the other branch leads directly back to the solution storage tank $22_a$; the latter branch is provided with a valve, which may be termed the "concentration valve," $28_a$. Solution storage tank $22_a$ drains to the inlet of a pump $30_a$; the condensate tanks $27_a$, $27'_a$, likewise drain, through a condensate tank drain line $31_a$, provided with a valve, which may be termed the "dilution valve," $32_a$, into the inlet side of pump $30_a$. The discharge outlet of the pump $30_a$ is connected by piping into the aforesaid chain reactive-amassment container $1_a$. In operation of this system, the fissionable-material—moderant solution $2_a$ is continuously circulated, by virtue of the action of pump $30_a$, through a closed path comprising, in order, the container $1_a$, the outlet pipe $12_a$, evaporator $21_a$, storage tank $22_a$, and finally pump $30_a$, from where it is returned through pump $30_a$, back into the container $1_a$, to commence another traverse of the path. In the evaporator $21_a$, however, a part of the solvent, water, in the solution passing therethrough is continuously evaporated, whereupon the water vapor rises through vapor line $23_a$, to the condenser $24_a$, while the resulting more-concentrated residual solution is discharged from the bottom of the evaporator into the solution storage tank $22_a$. Meanwhile the water vapor is condensed in condenser $24_a$, whence it drains through condensate drain line $25_a$, to the T $26_a$, from where, if the concentration valve $28_a$ is open, it uneventfully drains back into solution storage tank $22_a$. However, upon partially or completely closing "concentration valve" $28_a$, returning condensate is diverted into the pair of condensate tanks $27_a$, $27'_a$, wherein, with the "dilution valve" $32_a$ being closed, it accumulates. Thereupon, by appropriate adjustment of the setting of the "concentration valve" $28_a$, and the "dilution valve" $32_a$, the precise concentration of the solution passing through the aforesaid closed path may be precisely controlled. That is, at the commencement of operation of the system, with the solution initially quite dilute, by initially closing both "concentration valve" $28_a$, and "dilution valve" $32_a$, condensate returning from condenser $24_a$ is all diverted and accumulated in the condensate tanks $27_a$, $27'_a$, thereby producing a progressive increase in the concentration of the solution circulating through the container $1_a$, until the concentration becomes sufficiently increased that the amassment in the container $1_a$ will self-sustain a chain fission reaction. Thereupon, the "concentration valve" $28_a$ is opened so that all condensates subsequently produced then drains back into storage tank $22_a$; by virtue of the continuous retention of the preferentially-separated condensate water in the condensate tanks $27_a$, $27'_a$, the molal concentration of the circulating solution remains at a constant level, and the chain reaction in the container $1_a$ proceeds. Now, the valves are in their normal position; the "concentration valve" $28_a$ is open, and the "dilution valve" $32_a$ is closed. In order to increase the molal concentration of the circulating solution, and thus to tend to increase reactivity, when desired, "concentration valve" $28_a$ is partially or completely closed for a short period to divert a small additional amount of condensate into the condensate tanks $27_a$, $27'_a$, also to be there retained. Upon subsequently re-opening the concentration valve, the molal concentration of the circulating solution then remains constant at its new, increased level. On the other hand, for reducing the molal concentration of the circulating solution, the "dilution valve" $32_a$ is partially or completely opened for a short time, while "concentration valve" $28_a$ is retained in its normal open position; thereupon, a portion of the condensate in the condensate tanks $27_a$, $27'_a$ gradually drains through the condensate tank drain line $31_a$, into the inlet of pump $30_a$, and thereby progressively reduces the molal concentration of the circulating solution until the "dilution valve" $32_a$ is again closed. In effecting control of fission reaction rate in this manner, with all other conditions remaining constant, there will normally be a single molal concentration of the circirculating solution at which the amassment will be just critical, and consequently at which the rate of chain reaction will tend to remain constant at its current level. Upon increasing the solution concentration to any higher value, the amassment becomes supercritical; at any higher concentration, reaction rate engages in a progressive logarithmic rise at a pace depending upon the degree of supercriticality, and will continue in such rise until the concentration of the solution is returned to the value at which the amassment is just critical. Conversely, any concentration below this point will similarly result in a progressive logarithmic decrease reaction rate. Therefore, the appropriate procedure for increasing reaction rate from one constant level to a higher constant rate, for example, with the instant system comprises increasing the molal concentration of the solution slightly by closure of the "concentration valve" $28_a$, for just a short time and thereby putting the reaction rate on a slow logarithmic rise, and when the desired higher rate of reaction is attained, molal concentration of the solution is then returned to its initial value by opening the "dilution valve" $32_a$ for an appropriate short duration. Still, in the event that any conditions are changed, such as addition or removal of any neutron absorbers in the vicinity, or changing the effectiveness of the reflector or the like, a new, different molal concentration will normally become appropriate for maintaining the amassment just at the critical point; hence, any such changes in condition normally require appropriate change in solution concentration to retain rate of reaction at a constant level. In practice, however, even where care is taken to adjust the concentration toward exactly the critical value for the existing particular conditions involved, reaction rate, especially in view of its inherent instability, will tend to drift off into exponential increases and decreases in reaction rate away from the desired level, with varying severity; thereupon, the solution concentration must repeatedly be readjusted, so as to place the reaction rate on a slight rise or fall to appropriately compensate and correct for each of these excursions.

Referring next to the fully-engineered nuclear power plant illustrated in Figures 2, 3, and 4, much the same continuous-circulation and partial-distillation system as in Figure 1 is employed to effect the present reaction control method. To simplify correlation, those apparatus units in the Figures 2, 3, 4 system which represent counterparts of the basic apparatus units of Figure 1 are identified by counterpart reference numerals; while the Figure 1 units are identified by reference numerals bearing the subscript "$a$," the counterpart Figures 2, 3, 4 units are identified by the same numbers without subscripts.

In the overall reactor-power electric generating plant, illustrated in Figure 2, a spherical core tank 1, pressure-tight and adapted to contain a supercritical amassment of an aqueous solution 2, of uranyl sulfate highly enriched in $U^{235}$, is disposed centrally within, and in spaced relation to, an outer pressure vessel 3, adapted to drainably contain a content of deuterium oxide 4, immersing the core tank 1. The pressure vessel 3 is provided with a removable, pressure-tight gasketed cover 5, retained securely by nutted stud bolts 6, 6'.

Communicating substantially tangentially into the side of core tank 1 is a uranium solution inlet 7, while from the top of the core tank, and in communication with the interior thereof, a uranium solution surge standpipe 8 vertically ascends through the pressure-tight cover 5, and leads directly into the bottom of a pressure-tight expansion and pressurized vessel 9, surmounted upon the upper extremity thereof. Commencing at the upper periphery of the interior of the core tank 1, and disposed concentrically within, and internally spaced from, the surge standpipe 8 is a smaller-diametered uranium solution outlet pipe 10, which rises within the standpipe 8 through the cover 5, and thereupon bends perpendicularly to, and leaves the standpipe 8 through a pressure-sealed aperture 11, in the wall thereof. Inside the uranium solution outlet pipe 10, an even smaller-diametered gas discharge tube 12 likewise commences at the upper periphery of the interior of the core tank 1 rises within the uranium solution outlet pipe through the cover 5, continues upwardly and passes through the wall of the uranium solution outlet pipe 10, where that pipe bends perpendicularly and passes through the wall of the surge standpipe 8, through a second pressure-sealed aperture 13, in the wall of the standpipe 8. Outside of the standpipe 8, the uranium solution outlet pipe 10, proceeds to a tube-and-shell-type uranium solution heat-exchanger 14, where it is connected to the inlet 15, of a system of a multiplicity of U-shaped uranium solution conducting tubes (not shown) within the exchanger which ultimately discharges at the tube-side outlet 16, of the heat-exchanger 14. From such outlet 16, connecting piping leads to the inlet of an integrally-electrically-driven oil-cooled uranium solution centrifugal pump 17, which discharges into a uranium solution return pipe 18, which in turn leads back through the pressure-tight cover 5, and at its terminus forms said uranium solution inlet duct 7.

Meanwhile, the gas outlet tube 12, adapted to conduct evolved gases intentionally together with a relatively small but regular flow of uranium solution, after leaving the surge standpipe 8, is connected into the tube-side of a tube-and-shell economizer heat-exchanger 19, which in turn discharges through a uranium solution pressure-letdown throttling valve 20, into a steam-heated evaporator 21, integral with a plurality of elongated, slender, horizontal, external-water-coil-cooled, closed, cylindrical uranium solution storage tanks 22. Upward from the evaporator 21, a vapor line 23, leads into a water-cooled uranium solution condenser 24. From the condenser, a condensate drain line 25, descends to a T 26, where it forks into two branches, one leading into a pair of condensate tanks 27, 27', suspended from a weighing scale system (not shown), while the other branch leads directly back to the system of uranium solution storage tanks 22; the latter branch is provided with a valve, termed the "concentration valve," 28. The system of uranium solution storage tanks 22, drains into a discharge manifold 29, which is connected by piping to the inlet side of a diaphragm pump 30, actuated by a line of pulsating hydraulic fluid energized by a remote pulsating piston pump (not shown). The condensate tanks 27, 27', drain into a condensate tank drain line 31, provided with a valve, termed the "dilution valve" 32, which line terminates by T'ing into the uranium solution piping leading from the discharge manifold 29, at the inlet to the diaphragm pump 30. The diaphragm pump 30, discharges through the shell-side of the economizer heat exchanger 19, and on into surge standpipe 8, through a T 33, therein. Connected to the bottom of the core tank 1, a uranium solution dump line 34 curves upward, proceeds through the pressure vessel cover 5, passes through a fast-acting uranium solution emergency dump valve 35, and finally T's into the uranium solution piping at the low-pressure discharge side of pressure-letdown throttling valve 20.

Extending vertically upward from the pressure-vessel cover 5, and in communication with the interior of the pressure vessel 3, are three elongated, closed, tubular thimbles, 36, 36', 36", adapted to the disposition therein of lowerable "shim" and "safety" control rods 81, 81' (rod from thimble 36" not shown) adapted to have attached at their lower ends plates comprising cadmium and/or boron (not shown; removed for clarity), for mechanically-driven adjustable insertion into the body of deuterium oxide 4, in close proximity of core tank 1.

Communicating with the interior, and descending from the bottom, of pressure vessel 3, a deuterium oxide outlet line 38 is connected to the inlet of an integrally-electrically-driven, oil-cooled deuterium oxide centrifugal pump 39, which discharges through the tube-side of a tube-and-shell deuterium oxide heat exchanger 40, which in turn discharges back into the top of the pressure vessel 3, through one of the control rods thimble 36. T'd from the deuterium oxide outlet line 38, piping leads through a deuterium oxide pressure-letdown throttling valve 41, to a plurality of elongated, slender, horizontal, external-water-coil-cooled, closed, cylindrical deuterium oxide storage tanks 42; this tank system drains to the inlet of a deuterium oxide diaphragm pump 43, actuated, again, by a line of pulsating hydraulic fluid energized by a remote pulsating piston pump (not shown). The diaphragm pump 43, then discharges into piping T's back into the heavy water outlet line 38, at a point farther down thereon, toward the deuterium oxide centrifugal pump 39. Still farther along the deuterium oxide outlet line 38, there is T'd therefrom a deuterium oxide dump line 44, leading through a quick-operating deuterium oxide dump valve 45 and connecting into a deuterium oxide vapor manifold 46, which is disposed over and connected into the top of the deuterium oxide storage tank system 42, and is provided with a vapor line ascending to a water-cooled deuterium oxide condenser 47; a deuterium oxide condensate drain line 48, is provided for conducting deuterium oxide condensate back into the system of deuterium oxide storage tanks 42. To pressurize the deuterium oxide 4, in pressure vessel 3, with high-pressure helium, a remote source (not shown) of high-pressure helium is connected through a steam-heated silica gel absorber 49 into control rod thimbles 36, 36', leading to the interior of pressure vessel 3.

Enveloping the described, clustered apparatus is a radiation shield 50, comprising a special Barytes-containing concrete of several feet thickness, and fabricated of solid concrete blocks to afford removability, with only the outer courses thereof being mortared; removable access plugs 51, 52, 53, are provided in both its walls and roof.

Penetrating the shield 50, a boiler feed water inlet pipe 54, is connected into the shell-side of the deuterium oxide heat-exchanger 40; this in turn discharges through suitable piping into the shell-side of the uranium solution heat-exchanger 14. For conducting away the steam generated from the boiler feed water in the uranium solution heat-exchanger 14, a steam line 55, connects from the top of the shell-side of the heat-exchanger 14 into a steam drum 56, from which a steam delivery pipe 57, passes out of the shield 50, and into connection with the inlet of a steam turbine 58. The turbine 58 is adapted to drive an alternating-current electric generator 59; both are disposed outside the shield 50. Steam from the turbine 58, discharges into a water-cooled steam condenser 60, connected to the hot-well 61, of which a hot-well pump 62, is provided pumping steam condensate into a feed water storage tank 63, which in turn drains to a boiler feed water pump 64, which discharges into the aforesaid boiler feed water inlet pipe 54.

Returning attention to the evolved gases, which in intentional admixture with a portion of the uranium solution are adapted to be removed from core tank 1, through gas-outlet tube 12, the system beyond the letdown throttling valve 20 is adapted to afford escape of such gases from the liquid uranium solution at steam heated evaporator 21, whereupon they pass off through vapor line 23 to accumulate in the top of uranium solution condenser 24. For removal and recovery of gases accumulating there, a non-condensable-off-gas line connects from the uranium solution condenser 24 into a gas recombination and recovery system comprising, in order; first a flame recombiner 65, containing a spark-gap passing a continuous electric spark into contact with which the gases are passed for controlled combustion of their hydrogen and oxygen content back into water; second, a catalytic recombiner 66, containing a heated bed of platinum-surfaced catalyst for further recombining any remaining uncombined water components; third, a water-cooled off-gas condenser 67; fourth, a Freon-refrigerated cold-trap 68; and finally a battery of parallel charcoal absorbers 69, for absorbing any non-condensable radioactive gases, all backed up by a vacuum pump discharging into a tall meteorological smokestack for safe dispersal of any possibly-escaping radioactive gas to the atmosphere (neither shown). Suitable drain lines (not shown), for conducting recombined water back into the uranium solution system, lead from the various components of the recombiner system. Likewise, for recombining any deuterium oxide decomposed into component gases, which would analogously accumulate in the top of the deuterium oxide condenser 47, a similar deuterium oxide recombiner system, comprising, in order, a deuterium oxide catalytic recombiner 70, a water-cooled deuterium oxide off-gas condenser 71, a Freon-refrigerated deuterium oxide cold-trap 72, and a deuterium-oxide-system charcoal absorber 73, which discharges through another vacuum pump to the tall smokestack (neither shown), is provided.

Bridging from removable plugs in shield 50, horizontally penetrating through sealed apertures in the bottom of the pressure vessel 3, and terminating in closed ends just below the bottom of core tank 1, are several instrument tubes 74, 74', for affording removable insertion of radiation-measuring instruments (not shown) to the proximity of the core tank 1.

Not shown are thick vertical partition walls of shielding masonry which compartmentalize the several uranium solution and deuterium oxide circulation loops into respective separate cubicles, to enhance convenience, safety, and radiation-shielding effectiveness, or a maze of auxiliary water-cooling piping, sensory instrumentation for temperature, pressure, specific gravity, valve position telltale, and the like, and their telemetering lines, fluid lines for fluid-actuated diaphragm-controlled valves, an overall electrical system, apparatus structural supports, emergency standby cooling system, and the like, all of which are inherent, standard engineering adjuncts to a liquidprocessing and heat-power apparatus of the sort illustrated.

Referring to Figure 3, an enlarged and more detailed illustration of the central core tank—pressure vessel—expansion and pressurizing chamber—control rod thimbles sub-assembly of the Figure 1 reactor is presented in a partially cut-away view. Adhering to the Figure 2 reference numeral system, with new numbers for further details, core tank 1, disposed in pressure vessel 3, has tangentially communicating through its side the uranium solution inlet duct 7, which is looped completely around the surge standpipe 8, to afford ready linear thermal expansion of the duct. In communication with the interior of pressure vessel 3, and mounted upon the surge standpipe 8, is a catalyst recombiner 75, filled with catalyst pellets (not shown) for effecting recombination of decomposed deuterium oxide components directly within the pressure vessel 3. The surge standpipe 8, rises through the pressure vessel cover 5, and into the bottom of expansion and pressurizer chamber 9, which comprises simply a steam-heated tube-and-shell heater portion 76, with steam inlet 77, and steam condensate outlet 78, directly surmounted by a vapor dome portion, 79, having connected into its top a non-condensable-gas bleed vent 80. Symmetrically surrounding the expansion and pressurizer chamber 9, are the three vertical, cylindrical, closed-top control rod thimbles 36, 36′, 36″, communicating with the interior of pressure vessel 3. Adjustably suspended from within are "shim" and "safety" control rods 81, 81′, 81″, having affixed at their lower extremities, respectively, a regulating shim plate 82, comprising highly-neutron-absorptive boron, and fixtures of clustered pluralities of safety plates 83, 83′, also comprising boron curved as segments of vertical cylinders to closely fit, when in fully lowered position, around periphery of core tank 1. As shown in the representative cut-away view of one control rod thimble, raising and lowering, as desired, of each of the shim and saftey rods is effected, in its respective thimble, by an internal electric motor 84, driving a gear train 85, essentially rotating a nut on a non-rotating, vertical, threaded rod 86, the lower extremity of which rod is releasably connected to the top of the control rod 81′, through the action of an electromagnet 87, having its electrical leads 88, coiled springlike within the thimble to provide ready extensibility. Water-cooled jacketing 89, is provided to cool the lower portion of each thimble to reduce the temperatures to which the electrical equipment is exposed. For introducing fluids into the pressure vessel 3, through the control rod thimbles 36, 36′, a helium inlet line 90, and a deuterium oxide inlet pipe 91, are T'd into the thimbles. Having pressure fittings ready for connection with further piping are the uranium solution outlet pipe 10, the gas-outlet tube 12, and the uranium solution dump line 34, as is the line leading to the T 33, in the surge standpipe 8, for the introduction of make-up uranium solution. Spaced slightly from the interior walls of the pressure vessel 3, is a unitary flow liner 92, to direct the flow of incoming deuterium oxide first along the walls of the pressure vessel 3, to assure its adequate cooling. From the base of the pressure vessel 3, project deuterium oxide outlet line 38, and instrument tubes 74, 74′.

Referring now to Figure 4, and the enlarged cross sectional illustration of the internal details of the core tank shown therein, the spherical core tank 1 filled with uranium solution 2, has connected thereto at its North Pole, and communicating with the interior thereof, the vertical surge standpipe 8, which, in turn, has concentrically disposed therewithin and terminating at the periphery of the interior of the core tank 1, the uranium solution outlet pipe 10, and the smaller gas discharge tube 12. In further detail, the surge standpipe 8 is provided at its base with an ample flare 400, and is smoothly rounded at its juncture with core tank; likewise, the liquid outlet pipe 10, includes a smoothly rounded flare 401 at its lower extremity. The gas discharge tube 12, is provided with a broad, hemispherical, centrally-apertured nose 402, at its extremity, and integral liquid straightening vanes 403, adapted to curb continued rotation of the solution in the liquid outlet pipe after its egress from the core tank. The liquid inlet duct 7, leads substantially tangentially to the interior of the spherical tank. While tangential communication of this inlet duct 7 in the equatorial plane would be satisfactory, experimentation has revealed that the exact alignment of the axis of the vortex, and with it the central cavity, is governed principally by the position of the liquid outlet from the sphere; with a polar liquid outlet, the vortex produced by location of the tangential inlet anywhere from "45° north latitude" through "45° south latitude" will still be precisely aligned with the polar axis, and even tilting the angle of tangential introduction to 45° "north" or "south" of the perpendicular to the line of the "longitude" of the point of introduction has shown not to disturb the polar alignment of the vortex. Accordingly, in this instance, the tangential liquid inlet duct 7, is located at ca. 45° north latitude, and is aimed with about a 30° southerly tilt with respect to the perpendicular to the axial plane at the point of introduction. Connected at the south pole, the liquid drain pipe 34 leads from the tank. The tank is filled with the aqueous uranyl sulfate solution 2, except for the central gas-filled cavity 404, which forms in operation and aligns itself with the polar axis, and registers with the end of the gas outlet tube 12, at the aperture in its nose 402, upon continuous and rapid introduction of a stream of the fissionable material solution through the inlet duct 7. Superimposed are dotted lines demarcating general regions of liquid migration, identified as A through E, and provided with arrows to indicate the general direction in which the liquid drifts in these regions, in addition to its rapid rotation, in proceeding to the liquid discharge pipe 10.

In the operation, in accordance with the present invention, of the overall system shown in the Figure 2 and as enlarged in part in Figures 3 and 4, a continuous stream of an aqueous solution 2, of uranyl sulfate highly isotopically enriched in $U_{235}$, is vigorously injected, through uranium solution inlet duct 7, tangentially into the interior of the core tank 1, wherein it produces rapid rotation of the contained solution, establishing a vertical vortex therein. The uranium solution 2, fills the surge standpipe 8, and further partially fills the expansion and pressurizer chamber 9, on up through its steam heater portion 76; there the heater 76, heats the local solution to 285° C. which continues to vaporize into the pressurizer vapor dome portion 79, until the equilibrium vapor pressure at that temperature of 1000 pounds per square inch is attained, which pressure is hydraulically transmitted through the solution in the surge standpipe 8, to the contents of the core tank 1, and throughout the remainder of the system with which it communicates. With the pressure vessel 3, filled to an adjustable level with deuterium oxide 4, to serve as a neutron reflector, the content of $U_{235}$ in the core tank 1, is sufficient to constitute a supercritical mass and to self-sustain a chain-fission reaction which generates heat at such a rate as to heat the stream of uranium solution flowing through the core tank to 250° C. The heated uranium solution axially leaves the core tank 1, through the annulus formed between the uranium solution outlet pipe 10, and the gas outlet tube 12 concentrically disposed therein, and passes through the tube-side of the uranium solution heat exchanger 14, there giving up its heat to, and boiling, the boiler feed water in the shell-side thereof, and from there passes through the uranium solution centrifugal pump 17, which discharges it back through the uranium solution return pipe 18, to the uranium solution inlet duct 7, and thus maintains vigorous circulation of uranium solution through such loop. Meanwhile, within the core tank, the radiation of the fission reaction continuously induces considerable water decomposition with copious evolution of gaseous decomposition products; in accordance with the present invention, the evolved gases centripetally migrate rapidly to the axial cavity of the vortex, from which they are continuously discharged, together with amounts of uranium solution, through gas outlet tube 12. Discharge through gas outlet tube 12, is effected sufficiently rapidly that the gas-filled vortex-cavity is maintained at all times slimmer than the mouth of the gas-outlet tube 12 with which it registers, such that the cavity does not undesirably discharge gases into the uranium solution outlet pipe 10. From the gas outlet tube, the solution-gas mixture is then passed through the economizer-heat exchanger 19, to be cooled, and through uranium solution pressure-letdown throttling valve 20 to be throttled down to a pressure of only about 5 pounds per square inch, and on to the steam heated evaporator 21, where the solution is partially evaporated. The gas, together with evaporated water vapor, leaves through the vapor line 23, and passes to the uranium solution condenser 24, while the evaporator's distilland drains into the uranium solution storage tank system 22; at the condenser 24, the water vapor is condensed, while the evolved gaseous decomposition products of water accumulate at the top of the condenser, and are continuously withdrawn and passed through the flame recombiner 65, catalytic recombiner 66, off-gas condenser 67, and liquid-Freon cold-trap 68, to be recombined, condensed, and returned to the uranium solution system; non-recombinable, non-condensable gases, comprising predominantly gaseous fission product species, are then largely absorbed in the battery of charcoal absorbers 69.

The condensate from the uranium solution condenser 24, drains through the condensate drain line 25, to the T 26, whereupon, in the event that the "concentration valve" 28, is in its normal open position, all condensate drains into the system of uranium solutions storage tanks 22. However, if the "concentration valve" 28, is partially or wholly closed, part or all of the condensate from the uranium solution condenser 24, is diverted into the condensate 27, 27', with the relative proportion of the diversion depending upon the setting of the "concentration valve" 28. Uranium solution is continuously pumped from the system of uranium solution storage tanks 22, by the uranium solution diaphragm pump 30. With the "dilution valve" 32, in its normal closed position, no condensate drains from the condensation tanks 27, 27'; however, if the "dilution valve" 32 is partially or completely open, condensate drains from the condensate tanks 27, 27', through the condensate tank drain line 31, into the passing solution at the inlet to the diaphragm pump 30, thereupon progressively diluting the circulating solution at a rate depending upon the setting of the "dilution valve" 32. From the pump 30, the uranium solution is discharged through the shell side of the economizer heat exchanger 19, to be re-heated, from where it is routed back through the surge standpipe 8, to the core tank 1.

The foregoing operation of continuous retention of a variable proportion of condensate in the condensate tanks 27, 27', together with the continuous partial distillation of the uranium solution so as to enable immediate increase in the proportion of the condensate separately retained through manipulating the "concentration valve" 28, and immediately decreasing the proportion of condensate separately retained by adjusting the "dilution valve" 32, affords precise regulation of the molal concentration of the circulating uranium solution, and thereby continuous control over the rate of fission reaction taking place in the core tank 1, in essentially the same manner as was effected in the Figure 1 system. That is, on partially evaporating the uranium solution in evaporator 21, substantially plain water is distilled off, leaving a distilland of more concentrated uranium solution. With the "dilution valve" 32, in its normal closed position and the "concentration valve" 28 in its normal open position, the distilland and condensate both drain into the system of storage tanks 22, effecting no change in concentration therein. However, upon closing the concentration valve 28, with dilution valve 32 still closed, the distillate is routed to be retained in the condensate tanks 27, 27', and thus is restrained from returning to the tank system 22, resulting in a progressive increase in the concentration of the uranium solution being circulated through the core tank. Upon later reopening the concentration valve 28, the uranium concentration remains constant at its higher level, in view of the water withheld therefrom in the condensate tanks; thereupon, the ongoing solution may be rediluted as desired by judicious opening of the dilution valve 32, with concentration valve 28 remaining open, thereby gradually draining condensed water into the outgoing uranium solution. At the outset, the uranium solution originally charged into the nuclear power plant is of a concentration substantially lower than that required for self-sustenance of a chain fission reaction when amassed in the volume of the core tank 1; hence, commencement of the fission reaction is safely precluded until a proportion of the water has been preferentially removed and continuously retained apart in the condensate tanks 27, 27', from the solution circulating through the core tank. In this way, there will be, at all times during any chain-fission reaction, a substantial reserve of water in the condensate tanks to enable swift and sure shutdown of the reaction. Since the condensate tanks are suspended from weighing scale means, the weight of condensate in the condensate tanks 27, 27' is readily determined to indicate the concentration of uranium sulfate in the remainder of the system at any given time. For greater reliability and precision, it has been preferred to incorporate standard commercial instrumentation in the system for measuring and indicating the molal concentration of the circulating solution, either directly or indirectly, such as an electromagnetic densitometer, and/or a spectrophotometer cell (neither shown) in the closed uranium solution circulation path external the core tank. Setting of the "concentration valve" 28, and the "dilution valve" 32, by remote manual adjustment, or optionally by automatic positioning means responsive to the rate of fission in the core through the agency of radiation-determination instrumentation disposed in instrument tube 74, 74', while continuously circulating uranium solution through the core—evaporator—condensate-tank loop, is employed as the primary means for regulating the rate of fission reaction in the core of this reactor. Alternatively, automatic positioning means responsive to other variables substantially dependent upon fission reaction rate, such as temperature of the uranium solution in the core, or the steam pressure in the steam system on the shell side of the heat-exchanger 14, or the like, are also beneficially applicable.

The uranium solution dump line 34, passing from the bottom of core tank 1, and controlled by the uranium solution quick-acting dump valve 35, affords rapid emergency emptying of the contents of the core directly to the system of uranium solution storage tanks 22; the storage tanks 22, are maintained at a pressure about a thousand pounds per square inch lower than that in the core tank 1, so as to effect hasty removal, and are of a quite-small-girthed elongated configuration—a geometry which precludes the fissionable fuel solution contents thereof from ever attaining criticality.

Pressure vessel 3, is maintained partially filled, normally to such a level as to keep the core tank 1, completely submerged with deuterium oxide 4, which, in forming a ca. one foot thick jacket around the core tank 1, serves as a neutron-reflector for economizing neutrons in the chain reaction obtaining therewithin. The portion of pressure vessel 3, above the deuterium oxide surface is maintained filled with helium at substantially 1020 p.s.i., a pressure slightly greater than that of the uranium solution in the core, such that upon any rupture of the core tank 1, all leakage will be inward, to avoid hazardous effusion of the fissionable material. The helium is delivered, from a remote high-pressure source, through the steam-heated silica gel absorber 49, for purifying the helium, and through helium inlet line 90, leading to the pressure vessel 3, through "shim" and "safety" control rod thimbles 36, 36', thus pressurizing the deuterium oxide system. In operation, the deuterium oxide 4, in the pressure vessel, 3, becomes progressively heated, through its contact with the hot core tank 1, through its attenuative reaction with neutrons emanating into it, and through its contact with the walls of the pressure vessel 3, which also become heated as the result of attenuative reaction with neutrons and gamma rays. To dissipate such heat, the deuterium oxide is continuously circulated out of the pressure vessel through the deuterium oxide outlet line 38, then through the deuterium oxide centrifugal pump 39, which maintains the circulation, thereupon through the tube-side of the deuterium oxide heat exchanger 40, where the heat is transferred to the stream of boiler feed water flowing through the shell-side of the exchanger, and finally back into the pressure vessel 3. In re-entering the pressure vessel 3, the deuterium oxide flow is directed first against the inner walls of the pressure vessel by the flow liner 92, so as to avoid any impairment of the strength of the vessel through overheating. The deuterium oxide in the pressure vessel 3, is also subjected to intense ionizing radiation from the chain-reacting amassment in core tank 1, and consequently likewise suffers considerable decomposition into gaseous components. While the catalytic recombiner 75, mounted directly within pressure vessel 3, is normally effective in recombining decomposed deuterium oxide to a large measure, quite complete removal is insured by continuously discharging a portion of the circulating deuterium oxide stream from the deuterium oxide outlet line 38, through the deuterium oxide pressure-letdown throttling valve 41, into the system of deuterium oxide storage tanks 42, which are maintained near atmospheric pressure. The gaseous decomposition products, along with any deuterium oxide vapor, pass to the deuterium oxide condenser 47, from where, after condensation of the deuterium oxide vapor, the gases are withdrawn through the deuterium oxide catalytic recombiner 70, the deuterium oxide off-gas condenser 71, and the deuterium oxide cold-trap 72, where recovery by recombination and condensation of most all of the decomposed deuterium oxide is effected; finally, remaining non-condensable, non-recombinable radio-active gases are trapped in the deuterium oxide charcoal absorber 73, while any gases not trapped are meteorologically disposed to the atmosphere by discharge through the deuterium oxide vacuum pump to the tall smokestack (neither shown). To replace them deuterium oxide continuously removed from the deuterium oxide outlet line 38, the deuterium oxide diaphragm pump 43, is employed to continuously pump deuterium oxide from the storage tank system 42, back into the outlet line 38. It is particularly significant here that by adjusting the setting of deuterium oxide pressure-letdown throttling valve 41, the relative rate of deuterium oxide discharge from the outlet line 38 may be made greater than, equal to, or less than, the rate of continuous deuterium oxide replacement by diaphragm pump 43; in this way the deuterium oxide liquid level in the pressure vessel 3, may be rapidly varied and precisely fixed at any desired height. Since the degree of reactivity of the chain reacting amassment in the core tank 1, is directly dependent upon the neutron reflecting agency of its enveloping bath of deuterium oxide, decreasing the level of the deuterium oxide reflector 4 and the degree of submergency therein of the core tank 1, has a pronounced effect in correspondingly decreasing reactivity of the amassment within the core tank.

Therefore, changing the level of the deuterium oxide in the pressure vessel 3, by manipulating the deuterium oxide throttling value 41, may be employed as another "shim" control means for rough adjustment of the overall reactivity and rate of fission; more importantly, abruptly draining substantially all deuterium oxide from the pressure vessel 3, which generally results in immediate termination of the fission reaction, has proven to be especially efficacious for a panic shutdown of the reactor in an emergency. A quick-opening dump valve 45, is provided for rapidly emptying the deuterium oxide reflector from the pressure vessel 3, through deuterium oxide dump line 44, into the deuterium oxide vapor manifold 46, and on into the system of deuterium oxide storage tanks 42; again, the fact that the storage tank system 42, is normally maintained at a pressure almost a 1000 pounds per square inch below that in the pressure vessel 3, promotes rapid emptying, and the quite-small-girthed, elongated configuration of the storage tanks geometrically preclude the attainment of a critical mass therewithin, even if the core tank were misfortunately to rupture and discharge its content of uranyl sulfate into the deuterium oxide system.

In the operation of the "shim" and "safety" control rods 81, 81', 81'', safety plates 83, 83', are normally retained at their uppermost point of travel, away from the core tank 1; the regulating shim plate 82, is best retained at the uppermost point of its travel also, whence it serves as an additional safety plate, but may, especially in the case of operation at very low power levels, be maintained partially lowered toward the vicinity of the core tank 1, when needed, to compensate for any excessive reactivity of the chain reactive amassment. The boron in the safety plates and in the regulating shim plate, upon lowering the same toward their lowermost positions, voraciously absorbs neutrons which would otherwise be reflected back into the chain-reacting amassment in the core tank, and thus alters the degree of reactivity of the amassment; these plates may be moved upwardly or downwardly as desired through the drive means—such as electric motor 84, gear train 85, and threaded drive rod 86—as desired. Safety plates 83, 83', contain sufficient boron to render the amassment subcritical upon being lowered to their lowest point of travel immediately adjacent core tank 1; and may be lowered by their electric motor gear train to shut down the reactor gently when desired. Otherwise, for shutting down the reactor instantaneously in an emergency, energizing electrical current to the electromagnets, such as 87, in the control rod thimbles, is switched off, causing both the safety plates 83, 83', and regulating shim plate 82, to drop by gravity to a lowest position adjacent core tank 1, thereby rendering the reactor immediately sub-critical; such cutting of the energizing current to the electromagnet for abrupt shutdown is effectible both manually, and automatically by means responsive to excessive reaction rates through the agency of radiation-detection instrumentalities disposed in the instrument tubes 74, 74'. Subsequently, the dropped regulating and safety plates may be re-elevated by lowering the electromagnets until they contact the upper extremities of the control rods, whence re-energizing the electromagnets effects recoupling.

The short and direct connection of the core tank 1, to the expansion and pressurizing chamber 9, through the surge standpipe 8, affords prompt accommodation of surges in volume and pressure in the high-pressure uranium solution system; upon a surge, the uranium solution level merely rises further into the vapor dome portion 79, of the pressurizer, with the necessary space being automatically provided by resulting vapor condensation; to avoid interference in this condensation mechanism, vapors are constantly bled from the top of the dome through gas bleed vent 80, to avoid accumulation of non-condensable gas therein. Within the vapor dome 79, a buoyant chamber and variable inductance transmitter (neither shown) telemeters indication of the precise liquid level in the pressurizer 9, in response to which the uranium solution let-down throttling valve 20, is automatically adjusted to maintain a constant liquid level in the pressurizer.

For deriving useful power from the reactor in this system, boiler feed water is pumped from feed water storage tanks 63, by boiler feed water pump 64, via the boiler feed water inlet pipe 54, through the shield 50, and through the shell-side of the deuterium oxide heat exchanger 40, where it is partially heated by the deuterium oxide. Thereupon, the heated feed water proceeds through the shell-side of the uranium solution heat exchanger 14, wherein, in contact with U-shaped tubes filled with circulating uranium solution at ca. 250° C., the water boils; resulting steam proceeds away through steam line 55, and accumulates in the steam drum 56. From there, the steam, upon directly leaving the shield through steam delivery pipe 57, is passed into the steam turbine 58, to empower the same, which in turn drives the alternating current electric generator 59, thereby producing the end product—electric power—of the entire plant. Finally, the steam turbine 58, is backed by a conventional water-cooled steam condenser 60; the condensed water accumulating in the hot well 61, of which is returned by hot well pump 62, to feed water storage tank 63, for reuse as boiler feed water.

Concerning the operation within the core tank 1, itself, the special positioning of the inlet duct 7, directs the incoming liquid stream down through much of the Southern Hemisphere to promote continual mixing of liquid within the core, and to dispel deleterious relative stagnation, while still maintaining a steady vortex aligned with the polar axis. The flared and smoothed edges at the North Pole orifices coincide with the lines of liquid flow and serve to mitigate any turbulence in the vortex that the outlets might induce. With the broad nose 402, of the extremity of the gas outlet tube, minor excursions of the vortex cavity from normal polar alignment are tolerated without adverse loss of any separated gases into the liquid discharge pipe 10; in practice, the vortex axis tends to precess slightly, whereupon the extremity of the cavity merely dwells momentarily upon the facade of the nose before returning to its normal registry with the orifice of the gas outlet tube. The straightening vanes 403, by converting liquid rotational motion within the liquid discharge pipe into axial flow, serve to salvage kinetic energy and thereby to reduce the pressure drop required to maintain the vortex. With such a spherical core tank of 18 inches diameter, operated at a solution flow rate of a 100 gallons per minute, the pressure drop across the tank is only 15 p.s.i., and the afforded centrifugal force ranges from two times normal gravity at the equatorial periphery to 140 times gravity adjacent the central cavity. In a fission reaction therein at ca. 1000 kilowatts power level, gas evolution proceeds at a rate of ca. 400 cc. saturated gas at operating temperature and pressure per second; since the flowing solution becomes considerably supersaturated in dissolved gas, gas bubbles form and grow to separable size very rapidly, and are thereupon centrifugally forced to the cavity in a converging spiral flow path within the vortex, with an average bubble residence time in the rotating liquid of ca. ½ second. Communication of the liquid inlet duct with the core tank along a slight chord rather precisely tangentially, as is often required to facilitate fabrication, has proven satisfactory; in such case, if desired, a baffle may be provided at the inlet to divert the entering liquid stream as a sheet tangentially jetting along the inner wall of the core tank, with some increase in rotational velocity being thereby achieved. Vertical disposition of the polar axis is preferable, although disposition of the axis in any spatial direction has proven satisfactory. With respect to the characteristics of liquid flow in the vortex generated by the Fig. 4 system, as delineated by superimposed dotted lines, it is found that the entering liquid stream produces a turbulent region along the inner walls of the spherical tank. This region, designated as region "A," has the fundamental vortex rotation, but there is a considerable component of velocity along the sphere walls by-passing the heart of the reactor. Near the central axis of the sphere and surrounding the vortex cavity, there are three vaguely defined concentric cylindrical regions, "B," "C," and "D," respectively, where the direction of drift of the rotating liquid is up, down, and up, respectively. Between the outermost of the concentric cylindrical regions, "D," and the by-passing region "A" along the tank walls, is a region "E" wherein the liquid drift is predominantly centripetal. In the Northern Hemisphere, the migration in region "A" directly to the liquid outlet pipe results in some liquid short-circuiting the heart of the core; in the Southern Hemisphere, short-circuit drift in region "A" fosters the upward drift in region "D." The upward drift in inner region "B" seems fostered by a downward drift in the next outer region "C." The overall effect of these drifts on the primary centripetal migration is that the drifting liquid more rapidly shortcuts out of the core at the expense of some relative delay and overheating of the liquid which enters region "E." While this phenomenon may not be very serious at 1,000 kw. operation, it may ultimately prove particularly troublesome upon proceeding to operation at considerably higher power densities. For such contingency, it has been found that the phenomenon may be eliminated for the most part by disposing a few streamlined baffles, fins, or an inverted concentric bell-shaped palisade fixed in the bottom of the tank to divert part of the updraft in region "D" into region "E"; the best arrangement, though, comprises merely affixing a few slender horizontal rods extending from the tank walls to just short of the vortex cavity. In the case of the latter rods, the perpendicular liquid flow in passing produces a turbulent pressure loss behind them; the trailing low pressure area draws liquid through the stagnant region "E" and into the region "D" updraft, with wholesale mixing of the core contents ensuing, without significant obstruction of the liquid rotation.

The apparent optimum for such mixing rod arrangement is diagrammed in Fig. 6. Here again a tangential inlet 600 is disposed at ca. 45° north latitude, aimed 30° south of the perpendicular to the line of "longitude" of the point of introduction. A single slender radial rod 601, of length approximating 75% of the sphere's radius extends inward from the core tank wall, in the equatorial plane and at the 90th meridian from the inlet. A second slender radial rod 602, of the same length, is affixed at the 270th meridian, in the plane of the 30th parallel south. Also, at the 270th meridian, a third slender radial rod 603 only half as long as the others, is fixed in the plane of the 30th parallel north. Being cantilevered from the tank walls, the rods are preferably tapered slightly to reduce their susceptibility to resonance vibration and to increase strength at their base. Such arrangement gives evidence of constituting the minimum amount of rodding effective in bringing about effective destruction of the relative stagnation of region "E" in the dynamic vortex. Another method showing particular promise for promoting thorough mixing in the vortex comprises introducing a small supplemental stream of fuel solution in its colder inlet condition directly into the center of the vortex through the South Pole drain pipe; being denser than the ambient hot solution at the center, the colder liquid is centrifugally thrown outward through the vortex promoting considerable turbulence and mixing in its trajectory.

Returning attention to the remaining figure, Figure 5 diagrams schematically an electro-pneumatic actuating system for automatically manipulating the setting of the "concentration valve" and the "dilution valve" in response to the current neutron flux, to thereby maintain the rate of fission reaction constant at any given selected value. This actuating system is applicable to the continuous-circulation partial-distillation arrangement outlined in Figure 1, and is optionally applicable to the overall nuclear power plant illustrated in Figures 2, 3, and 4. Connected across a supply of direct current, the potential of each of the pair of supply terminals being sustained at a constant value with respect to ground, is a voltage-dividing electrical circuit, commencing at the more positive terminal 501, and proceeding to the less positive terminal 502, and comprising, in order, a compensated ionization chamber 503, a principal rheostat 504, and a supplemental rheostat 505. Connected to the circuit between the ionization chamber 503, and the principal rheostat 504, an error-signal wire 506, leads to a voltage amplifier 507. In the principal rheostat 504, the winding is not continuous, but advances in ca. 250 steps, with a separate contact point at each step; furthermore the magnitude of the resistances in each step increase logarithmically from maximum resistance toward minimum resistance. Thus, the first step is ca. 10,000 ohms, while the final step is 1. megohm. Moreover, the contact arm of this logarithmic rheostat 504, is driven, through worm gearing, by a constant speed motor (not shown), adapted to a constant slow speed that affords increase or decrease of resistance at the pace of multiplication by a factor of $e$ (i.e. 2.718) in 20 seconds. The supplemental rheostat 505, is manually adjustable to afford vernier interpolation between the steps of the principal rheostat; alternatively, this supplemental rheostat may be replaced by a potentiometer of equivalent range to satisfy the same purpose. From the voltage amplifier 507, an amplified error-signal lead 508, emerges and forks, whereupon each fork leads to a different one of a pair of substantially similar conventional pneumatic proportional-position controllers 509, and 510, respectively. The basic constitution of each of these controllers is illustrated in the case of the upper of the two controllers 509. As shown there, the amplified error signal lead 508, is connected through an ordinary voltmeter drive, comprising a voltmeter coil 511, and voltmeter permanent magnet 512, to ground. The voltmeter drive, through a light kinematic linkage 513, 513', is adapted to actuate a light flapper reed-vane 514, which is pivoted as a simple lever about a fulcrum at the extremity of a longitudinally-reciprocable rod 515; a tension spring 516, yieldably resists the action of the voltmeter drive, so as to retain the linkage in a "normal" or "zero" position at all times that the potential impressed across the voltmeter is below a pre-selected level. An air-supply tube 517, leading into the controller to provide a supply of air from a regulated pressure source, leads to the inlet of a valve 518, from the discharge of which is connected an air-pressure delivery tube 519. Teed into the air-supply tube is a bleed-tube 520, provided with a throttling restriction 521, and terminating in a nozzle 522, which is directed to impinge upon, and almost touches, the flat surface of the flapper reed-vane 514, at its lowermost extremity. Between its restriction 521 and nozzle 522, the air-bleed line 520, communicates with an elastically-distendable first metal bellows 523, on the face of which is affixed the valve stem of valve 518. The air-pressure delivery tube 519, communicates with a second elastically-distendable bellows 524, stationarily-affixed at one face and having the reciprocal rod 515 affixed to its other face, and adapted to longitudinally displace the rod 515, upon its distention, in a direction so as to urge the flapper reed-vane 514 pivoted thereupon in a direction toward the nozzle 522. Leaving the pneumatic proportional-position controller 509, the air-pressure delivery tube 519, is connected into a conventional pneumatic valve-positioner 525, which is mechanically linked in a standard fashion to a pneumatic diaphragm valve motor 526, which is served by a power-air delivery tube 527; the pneumatic valve motor 526, finally is linked mechanically to the stem of the "dilution valve" 528. In substantially the same manner, the lower pneumatic proportional-position controller 510, the internal constitution of which is essentially similar to that of the upper controller 509, is operatively connected to a second pneumatic valve-positioner 529, which is mechanically linked to a second pneumatic diaphragm valve motor 530, which itself is mechanically linked to the stem of a "concentration valve" 531.

In the operation of the Figure 5 automatic-valve-actuating system, the ionization chamber 503 is directly exposed to the neutron flux of the chain-reactive amassment, by means of being disposed within, or in close proximity to, the core, such as by being disposed within the inner extremity of one of the instrument tubes 74, 74' of the Figure 2 power plant. The ionization chamber basically involves a counterposed pair of large electrodes separated by a body of inert gas such as nitrogen; in the region between the electrodes a layer of a material, such as boron 10, which has a great propensity for absorbing neutrons with concomitant emission of alpha radiation. The resulting alpha emission within the chamber serves to ionize the inert gas between the electrodes, so as to promote electrical discharge between the electrodes, and thus reduce the effective electrical resistance across the chamber; over the pertinent ranges of neutron flux, the resistance of the chamber varies inversely and substantially linearly with neutron flux. Accordingly, with current flowing through the voltage-dividing circuit, the voltage drops across the ionization chamber 503, and across each at the two rheostats 504 and 505, are proportional to their resistances, such that the error-signal wire 506 will have an absolute potential such that the ratio between the potential drop from the more positive terminal 501, to V$i$ and the potential drop from V$i$ to the less positive electrode 502, will at any time be identical to the ratio between the resistance of the ionization chamber 503, and the sum of the resistances of the rheostats 504 and 505. Thus, for any fixed setting of the rheostats 504 and 505, increase in neutron flux will result in an increase in potential of V$i$, and vice-versa. Based upon this change of V$i$ with change of neutron flux, the principle of this actuating system comprises permanently assigning to V$i$ a single "normal" value, and utilizing the voltage amplifier 507, and the remaining pneumatic system to effect, at any time that the actual value of V$i$ is at all different from the assigned "normal" value, alteration of the "concentration" valve and "dilution" valve so as to alter the molal concentration of the solution circulating through the chain-reactive amassment, thereby serving to alter the rate of reaction, and in turn the neutron flux, towards returning V$i$ to its assigned "normal" value. The actual magnitude of neutron flux necessary to cause V$i$ to assume the "normal" value depends upon the setting of the rheostats 504 and 505; accordingly, the level of reaction rate at which this automatic actuating system will retain the reactor is selected and varied by setting and adjusting the rheostats 504 and 505. In proceeding to actuate the "concentration" and "dilution" valves in response to the resulting "error-signal"—i.e., the indicated extent and direction by which potential of V$i$ is displaced from its "normal" value—the potential of V$i$ is linearly amplified by the voltage amplifier 507, producing an amplified error-signal, which may be identified as V$i'$, which is thereupon fed, by amplified error-signal lead 508, into the two pneumatic-proportional positional controllers 509 and 510. By appropriate pre-adjustment of the tension spring 516 in the upper controller 509, the voltmeter-drive-actuated kinematic linkage 513, 513', is retained in a "normal" or "zero" position at all times that the value of V$i'$ is at or below its "normal" value corresponding to the assigned "normal" value of V$i$, but for any higher values of V$i'$, the voltmeter drive and linkage are adapted to be progressively further displaced by progressively higher potentials above "normal" value for V$i'$. Such displacement of the inkage 513, 513', draws the upper extremity of the flapper reed-vane 514, to the left; this results in a pivoting of the vane about its fulcrum at the left end of the reciprocable rod 515, and accordingly, results in displacement of the lower extremity of the vane to the right and away from the mouth of the nozzle 522. Thereupon, the escape of air from nozzle 522, which is constantly taking place, becomes less restrained, resulting in reduced pressure in the first bellows 523, which thereupon contracts, drawing up the stem of, and opening, the air-valve 518. The air consequently permitted to enter the air-pressure delivery tube 519, serves to build up pressure therein, whereupon such pressure is transmitted to the interior of the second bellows 524, causing it to distend, and displace the reciprocal rod 515 and the fulcrum of reed-vane 514, thereon, to the left. This tends to return the lower extremity of the reed-vane 514, back toward the mouth of nozzle 522, thereby again restricting air escape, in turn causing increase in pressure within, and distention of, the first bellows 523, acting to reclose the air-valve 518.

Such action of the second bellows 524, and reciprocative rod 515, in this fashion serves to feed back an indication of the magnitude of the controlled variable—i.e., the air-pressure in delivery tube 519—such that for each different position of the voltmeter drive, and thus of V$i'$, over the operative range, there will result a corresponding particular value of pressure in the delivery tube 519. The resulting pressure in delivery tube 519 actuates the conventional pneumatic valve-positioner 525, which serves in its usual manner as a pilot for mechanically controlling the position of the pneumatic diaphragm valve motor 526, served by its own source of actuating air through the power-air delivery tube 527, which in turn mechanically adjusts the degree of opening of the "dilution" valve 528, in such a way that the valve will tend to be opened from its normal closed position as the pressure in delivery tube 519 increases and furthermore will assume a different specific degree of opening for each different value of pressure in delivery tube 519. The counterpart lower half of the pneumatic portion of the overall system operates in much the same manner, with the exception that the voltmeter-drive in the lower pneumatic proportional-position controller 510, is pre-set to remain in "normal" or "zero" position, during all times that the potential of V$i'$ is at or above its "normal" value but to operate over a range of potentials below the normal potential, becoming displaced further as V$i'$ progressively decreases below its "normal" value. Furthermore, the normal position of the "concentration" valve 531, is fully open, with the pneumatic valve-positioner 529, and pneumatic diaphragm valve motor 530, being adapted to further close the concentration valve 531, the lower V$i'$ falls below its "normal" value.

As the "dilution" valve 528, here, corresponds with the "dilution" valve 28$_a$ in Figure 1, or 28 in Figure 2, such opening results in progressive decrease in concentration of the solution circulating through the chain-reactive amassment, thus tending to reduce reactivity and return the reaction rate, neutron flux level, and the potential of V$i$ to the desired "normal" value, whence the dilution valve thereupon recloses. In similar manner, when neutron flux and the potential of V$i$ fall below the desired "normal" value, the upper controller 509 remains in "zero" position, while lower controller 510 operates to partially or wholly close the "concentration" valve from its normal open position, to thereby similarly increase neutron flux and reaction rate and return the potential of V$i$ to its "normal" value. When the reaction rate, and thus the potentials of V$i$ and V$i'$, are at exactly the desired point, both the upper and the lower pneumatic controller, 509 and 510, remain in their "zero" position, such that the "concentration" valve remains in its normal open position and the "dilution" valve in its normal closed position, thereby effecting no change in solution concentration. Altering the reaction rate to a different desired level is effected simply by altering the settings of the rheostats 504 and 505 to provide a new additive resistance; cutting in more resistance lowers the "normal" reaction rate, while cutting out resistance raises it. To avoid large changes in the combined resistance of the rheostats so abruptly that the rate of reaction will be occasioned to increase at a rate exceeding a safe pace to the end that the reaction rate might course through the desired higher level and up to a damaging extreme height before the rise can be checked, the setting of the contact arm of the principal rheostat 504, rather than being adjustable manually, is driven by a constant speed motor through a worm-gear. In this connection, for adequate safety it is sufficient that the rate of logarithmic increase in reaction rate be maintained below a reasonable maximum; the logarithmic increase in the magnitude of the resistances between steps therefore enables the slow constant speed drive to retain increases in reaction rate appropriately at a safe pace over the entire range. Finally, the vernier rheostat 505, enabling interpolation between the steps in the principal rheostat 504, affords a fine manual adjustment of the exact reaction rate setting.

Considering, more particularly, the special aspects and incorporated refinements in the overall reactor system illustrated in Figures 2, 3, and 4, uranyl sulfate has been found to possess eminent attributes especially favoring its selection as the form of the fissionable material to be employed. Over the operational range, the thermal stability of the sulfate salt is definitely assured; the phase diagram of the uranyl-sulfate-water system has been determined up to the critical point, and the system is found to remain homogeneous at all concentrations up to 294° C. Also, notable radiation stability is exhibited; in aqueous solution, uranyl sulfate remained clear and unprecipitated upon irradiation in an operating neutronic reactor at a neutron flux of $5 \times 10^{11}$ neutron/cm.$^2$/sec. for so long as 2900 hours, thus giving indication of retaining radiation-stability indefinitely, although its aqueous solvent, of course, suffers considerable decomposition into its component gases. Advantageously, the sulfur atoms incidentally introduced have a neutron absorption cross section so low as 0.4 barn, and hence are practically innocuous from a neutron absorption standpoint. Aqueous uranyl sulfate, however, is seriously corrosive to metals of construction; the problem is doubly deleterious since the corrosive action depletes the solution of sulfate ions, leading to the progressive precipitation of uranyl oxide, which represents hazardous accumulation of fissionable material as a highly-concentrated precipitate. However, stainless steel, especially No. 347, and zirconium have demonstrated staunch resistance to such corrosion; their use for all surfaces in contact with the sulfate has proven to largely obviate the difficulty. Among other applicable soluble compounds of fissionable material, uranyl nitrate exhibits good radiation stability and low propensity for neutron capture, but is subject to serious hydrolytic decomposition above about 175° C. wherein it evolves gaseous oxides of nitrogen in aggravation of the bubbling difficulties; accordingly, while aqueous uranyl nitrate is applicable below this temperature, it is rather unsuitable for the higher power generation rates. In the case of uranyl fluoride, although the fluorine atom is acceptable from a low neutron absorption standpoint, and the compound has been found thermally stable in general, although engaging in some hydrolysis to exert a hydrogen fluoride vapor pressure, up to 250° C., it exhibits inordinate corrosiveness—a detractive practical shortcoming.

Normal water is pre-eminent as the liquid moderator; deuterium oxide could also be effectively used, but normal water has a considerably shorter slowing down length for neutrons, so affords a smaller reactor core. Similarly for the reflector, natural water or else a solid such as beryllium, beryllium oxide, or graphite is suitable. However, deuterium oxide is the particularly preferred reflectant in that it is a drainable liquid affording enhanced mechanical convenience and safety, and that it is characterized by a substantially greater ratio of $$\frac{\delta_s}{\delta_a}$$

than natural water, representing superior reflectant quality. The latter advantage obtains inasmuch as deuterium oxide has a neutron absorption cross section per molecule ($\delta_a=0.0009$ barn) lower by ca. three orders of magnitude than that of natural water ($\delta_a=0.69$ barn) but a neutron scattering cross section per molecule ($\delta_s=15.4$ barns) lower by only a factor of six than that of natural water ($\delta_s=94.1$ barns).

An unusual and especially significant attribute of the illustrated reactor system for practical application is that it is inherently self-stabilizing so as to resist changes in rate of fission reaction. This propitious characteristic is due predominantly to the exceptionally high negative temperature coefficient of the instant reactor system; that is, the degree of chain reactivity of the reactor varies to a pronounced degree inversely to changes in the temperature of the fuel solution in the core. Simply, at the high temperature range employed in operation, uranyl sulfate solution density is a sensitive function of the temperature, decreasing pronouncedly with temperature increase, with corresponding liquid expansion; since the volume of the core tank is fixed, such expansion results in the displacement of a commensurate proportion of the fuel solution from the core, and the consequent decrease in fissionable material content of the core serves to lessen the degree of chain reactivity of the amassment. Therefore, since the temperature of the fuel solution responds directly and virtually instantaneously to the rate of chain reaction, and since a surge standpipe and an expansion chamber of ample proportions are immediately affiliated with the core tank to permit unimpeded expansion of fuel solution from the core, any incipient upward excursion of reaction rate is immediately checked by the ensuing expansion and decrease in reactivity. As a result, the system automatically counteracts propensities toward increases in reactivity and rate of reaction much more potent than those which would completely destroy most other types of reactors. Consequently, the usual need for complicated, failure-proof, constantly-acting, high-speed control mechanism is avoided in this particular design, whereupon, instead, it becomes satisfactory to resort merely to manual manipulation of the "concentration" valve and "dilution" valve to alter the continuously-retained proportion of water to thereby change molal concentration and so serve to alter reactivity, as becomes desirable, with virtually no danger that the rate of reaction will tend to deleteriously run away in either direction. Accordingly, a reactor system of inherent safety eminently suited for common power plant practice is afforded. Furthermore, increasing molal concentration in this system increases the solution temperature at which a given power-productive rate of fission reaction will obtain, and vice-versa. This has an especially significant application: By adjusting molal concentration, via the instant method, to the point where the desired general level of reaction rate to satisfy the general level of power production demand will occur when the solution temperature is at a general level satisfying the heat-transfer design characteristics of the uranium heat-exchanger 14 corresponding to a transfer of heat at said desired rate, a general automatic response of reactor operational level to minor fluctuations in the demand of electric power and hence turbine steam may be realized. That is, at such molal concentration, any minor increase in the steam discharged to the turbine is accompanied by an increase in the introduction of boiler feed water to the uranium solution heat-exchanger 14, whereupon the resulting greater rate of cooling of the uranium solution tends to reduce the mean temperature of the fuel solution in the core, to increase its density, and in turn to increase its fissionable material content, and thus to increase the rate of fission reaction, thereby tending to provide the additional thermal power demanded in the form of a somewhat increased production of steam of somewhat lower temperature.

Extraordinarily, three independent means upon which the self-sustenance and rate of fission depends are provided in order to insure against any hapless loss of control over the reaction. First, a general operational adjustment, both coarse and delicate, for start up, for use throughout power production, and for shutdown, is afforded by the present method of continuous retention of adjustable proportion of the solution's aqueous solvent. Response to this control means is generally rapid and oscillations of reaction rate around the desired level are quickly damped out, by virtue of the fact that ca. 75% of all uranium solution involved is within the core at any one time. Second, by draining the deuterium oxide neutron reflector from the pressure vessel, the fission reaction may be hastily terminated; furthermore, a very coarse general regulation of reaction rate is effectible by adjustment of the depth of deuterium oxide covering the top of the core tank, through varying the setting of deuterium oxide throttling valve 41. Finally, the third separate control means, largely for use in starting up and shutting down the reactor operation, especially for emergency shutdown, resides in the vertically-movable regulating shim plate 82 and safety plates 83, 83', which afford insertion of sufficient quantities of highly-neutron-absorptive boron in the proximity of the core to render the amassment immediately sub-critical. For a reactor system, successfully constructed and operated, having proportionate dimensions such as shown in Figures 2, 3, and 4, the established degree of effectiveness of each of the three separate control means and other variations and operating conditions, with respect to the decrease in the number of neutrons from one successive generation to the next in the chain reaction which is effectible by each means, is set forth in Table I below.

TABLE I

*Effect of control means and variations in operating conditions on reactivity*

| Control means | $\frac{\Delta k_\text{eff}^*}{k_\text{eff}}$ |
|---|---|
| Uranium Solution Concentration Adjustment (Aqueous $UO_2(SO_4)_2$ at 30 gms. $U^{235}$/liter). | 1.05% per gm. $U^{235}$/liter at 250° C. and 1,000 p.s.i. |
| Reflector Removal | −6½ −8%. |
| Control Plates (Full Insertion): | |
|   Regulating Shim Plate | −0.42. |
|   Safety Plates (each fixture) | −0.61. |
|   Total | −1.64. |
| Variations in Operating Conditions: | |
|   Change of Uranium Solution Temperature (At 250° C., free flow from core tank). | −0.17% per ° C. |
|   Erraticalness of Bubbling of Evolved Gases. | 0.1% maximum. |

*$k_\text{eff}$=effective multiplication factor=statistical number of neutrons generated by fission in one generation per each neutron generated in the preceding generation—in other words, the number of neutrons actually completing the cycle of deceleration, thermal diffusion in core, capture by fissionable material, and fission, per one starting from fission.

$k$=multiplication factor=the $k_\text{eff}$ which would obtain if the particular core were extended to infinite size, so as to avoid the permanent escape of neutrons which occurs from a core of finite size.

$\Delta k_\text{eff}$=change in $k_\text{eff}$ produced by indicated adjustment of conditions.

The marked effect of reflector removal in decreasing and distinguishing reactivity is readily apparent; the extent of this effect in terms of the greater quantities of $U^{235}$ required to constitute a critical mass in the absence of the reflector is further demonstrated in Table II below.

TABLE II

*Effect of reflector removal and core cooling on quantity of $U^{235}$ required for criticality*

| Core Temperature (° C.) | Reflector | k Required for Criticality* | Critical Concentration* (gm.$U^{235}$/kg.$H_2O$) | Critical Mass* (gm.$U^{235}$) |
|---|---|---|---|---|
| 250 | Full 100° C | 1.559 | 38 | 1,500 |
| 250 | Empty | 1.714 | 60 | 2,380 |
| 20 | Empty | 1.405 | 31 | 1,550 |

*In 18″ diameter spherical vortex with slender central cavity.

At start up of the reactor, sufficient deuterium oxide reflector is provided to fully immerse the core tank, a sufficient degree of elevation of the regulating shim plate and complete elevation of the safety plates is effected, and the molal concentration of the uranyl sulfate solution circulating through the core tank is gradually increased by separation and continuous retention of water from the solution until the amassment in the core tank 1, becomes chain reactive, and fission reaction proceeds. Upon a normal shutdown of the reactor, the molal concentration of the circulating sulfate solution is simply rediluted by release of condensate from the condensate tanks 27, 27', until the reaction ceases; as a safety precaution, in the event that the reactor is to remain shut down for any extended period, the deuterium oxide reflector 4 is completely drained from the pressure vessel 3, the shim plate 82, and safety plates 83, 83', are fully inserted to their lowest positions, and the entire contents of the core tank 1, and the condensate tanks 27, 27', is removed to the system of uranium solution storage tanks 22, through dump line 34, dump valve 35, and dilution valve 32. For a panic shutdown in an emergency, first the regulating shim plate and the safety plates are immediately released and dropped by de-energization of their retaining electromagnets; the $$1.22\% \frac{k_{eff}}{k_{eff}}$$

available in these plates is adequate for abruptly rendering the amassment momentarily sub-critical. However, upon so rendering the amassment sub-critical with the control rods alone, continued cooling of the uranium solution by the boiler feed water in the uranium solution heat exchanger rapidly increases the density of the circulating fuel liquid and concomitantly the total amount of fissionable material in the core tank, to the end that enough fissionable material would be progressively amassed to again attain criticality—despite the presence of the lowered regulating and safety plates—whereupon fission reaction would recommence, all frequently in less than a minute. While this interval of sub-criticality may well be considerably protracted by immediately opening fully the "dilution valve" 32, and cutting off any further introduction of boiler feed water or removal of steam from the uranium solution heat exchanger, so as to minimize the uranium solution cooling rate, nevertheless in any case the standard procedure is to immediately drain the deuterium oxide reflector so as to preclude the core from re-attaining criticality; with proportions as illustrated and with a commercial quick-operating dump valve for the reflector, the deuterium oxide is found completely drainable in 20–30 seconds—ordinarily ample time for avoiding recommencement of the reaction. It is significant that in normal operation, also, the reaction exhibits the same recovery of criticality upon any amount of insertion of the regulating and safety plates; upon such insertion, the reaction then requires a denser and thus cooler uranium solution to sustain reaction, such that the final equilibrium effect of the plate lowering or raising is merely to decrease or increase, respectively, the temperature attained in the reaction, with little effect upon the rate of power generation by the reactor. For accomplishing the automatic de-energization of the retaining electromagnets, so as to drop the regulating shim plate and the safety plates, upon the reactors exceeding a pre-selected maximum rate of reaction, actuating instrumentation substantially the same as that described for the same purpose in companion application S.N. 357,216, filed May 25, 1953, in the names of Henry W. Newson et al., for Over-all Control System for High Flux Pile, cited supra, is applicable.

Concerning the compensated ionization chamber, and the individual pneumatic apparatus components assembled in the Figure 5 automatic-actuating system, further details relating to preferred units may be found in the following sources:

Compensated ionization chamber—Appln. S. N. 153,249, —in the name of S. M. MacNeille, filed March 31, 1950, for Compensated Ion Chamber, now Patent No. 2,714,677, issued August 2, 1955;

Pneumatic proportional-position controller—Chemical Engineers Handbook, third edition, edited by J. H. Perry, page 1321, et seq., McGraw-Hill 1950;

Pneumatic valve positioner—Industrial Instruments for Measurement and Control, P. J. Rhodes, pages 502–503, McGraw-Hill, 1941;

Pneumatic diaphragm motor—Perry, op. cit., pages 1328–1329.

Further illustration of the quantitative aspects and preferred conditions and procedures of the present method and means is provided in the following specific example.

EXAMPLE

A full-scale neutronic reactor, adapted to power an electric generating plant, substantially as illustrated in Figs. 2 and 3 and having a core-tank system as diagrammed in Fig. 4, has been constructed and successfully operated, as a prototype for like reactor systems of the same and much larger power production capacity, for both stationary industrial, and mobile propulsive applications. The general details of materials, dimensions, and operational parameters, both for operation of the reactor at design point— 1000 kw. fission reaction rate—, and at 20% of design point power—200 kw.—, are tabulated in Table III below.

TABLE III

*Design and operational data for reactor-powered electric generating plant as illustrated in Figures 2 and 3*

| Percentage of Design Point Reactor Operational Power Rate | 20% | 100% |
|---|---|---|
| Reactor: | | |
| Power Level | 200 kw to | 1,000 kw. |
| Net Power Output (Electrical) | | 120 kw. |
| Gross Power Output (Electrical) | 20 kw | 140 kw. |
| Overall Efficiency | | 12%. |
| Volume of Core | 50 liters | |
| Power Density | 4 kw./l | 20 kw.l. |
| Fuel Material | $UO_2SO_4$ in water, 30 g./l, $U^{235}$ | |
| Percent Enhancement of Uranium in $U^{235}$ | 93.4% | |
| $U^{235}$ Consumption | 0.2 g./day | 1 g./day |
| $U^{235}$ Required | 2100 g. | |
| Core Tank: | | |
| Inside Diameter of Core | 18 in. | |
| Thickness of Core Vessel | 3/16 in. | |
| Material of Core Vessel | 347 Stainless Steel | |

TABLE III—Continued

| Percentage of Design Point Reactor Operational Power Rate | 20% | 100% |
|---|---|---|
| Core Tank:—Continued | | |
|   Pressure in Core | 1,000 p.s.i.a. | |
|   Temperature in Core | 250° C. (482° F.) (Outlet) | |
|   Fabrication | All welded construction | |
| Core Connections: | | |
|   Inlet Duct | 1½ in. schedule 80* | |
|   Outlet Pipe | 1½ in. schedule 80 | |
|   Gas Outlet Pipe | ⅛ in. schedule 40 | |
|   Surge Standpipe | 3 in. schedule 80 | |
|   Drain Pipe | ¼ in. schedule 40 | |
| Reflector Pressure Vessel: | | |
|   Inside Diameter of Pressure Vessel | 39 in. | |
|   Thickness of Pressure Vessel | 3 in. | |
|   Material of Pressure Vessel | Carbon Steel | |
|   Material of Reflector | $D_2O$ | |
|   Pressure in Reflector | 1020 p.s.i.a. | |
|   Design Pressure | 2000 p.s.i.a. | |
|   Diameter of Bottom Flange and Cover | 34½ in. | |
|   Thickness of Cover | 10 in. | |
|   Temperature in Reflector | 175° C. | |
|   Volume of $D_2O$, full Reflector | 450 liters | |
|   Inert Gas in Reflector | Helium | |
| Solution Recirculating System: | | |
|   A. Recirculation— | | |
|     Flow Rate | 100 g.p.m. | |
|     Type Pump | Canned Armature Centrifugal Pump. | |
|     Material of Pump | Stainless Steel | |
|     Head at 100 g.p.m. | 290 ft. water (102 p.s.i. at 250° C.) | |
|     Efficiency | 34% | |
|     Required Power | 13.2 kw. | |
|     Cooling Oil Requirements | 20 g.p.m. @ 5–10 p.s.i. pressure drop. | |
|     Residence Time in Core Tank | 8 sec. | |
|     Total External Holdup of Recirculation System | 10 liters | |
|     Holdup in Piping | 2–4 liters | |
|     Holdup in Pump | 1 liter | |
|     Percent Delay Neutrons Lost Externally | 16% | |
|     Holdup in Uranium Solution Heat Exchanger | 5.5 liters | |
|     Holdup in Pressurizer | 1.5 liters | |
|     Residence Time in External System | 2 secs. | |
|     Size of Piping | 1½ in. Stainless Pipe, Schedule 80 | |
|     Velocity in Piping | 18 ft./sec. | |
|   B. Uranium Solution Heat Exchanger | 200 kw. Level | 1000 kw. Level. |
|     Temperature of Solution In | 482° F. | 482° F. |
|     Temperature of Solution Out | 467° F. | 407° F. |
|     Operating Steam Pressure | 458 p.s.i.a. | 210 p.s.i.a. |
|     Operating Steam Temperature | 458° F. | 386° F. |
|     Type of Heat Exchanger | Shell and U Tube Steam Generator. | |
|     Materials | Stainless Tubes, Steel Shell | |
|     Tubing | ¼ in. O.D., 18 gage | |
|     Outside Heat Transfer Area of Tubes | 75.5 sq. ft. | |
|     Number of Tubes | 112 | |
|     Length of Each Tube | 100 in. average length | |
|     Length of Heat Exchanger | 7 ft. | |
|     Diameter of Shell | 26¼ in. I.D. | |
|     $H_2O$ in Heat Exchanger | 500 lbs. | |
|     Pressure Drop of Solution Across Exchanger | 25 p.s.i. | |
|     Velocity Through Tubes | 15.8 ft./sec. | |
|   C. Pressurizer— | | |
|     Operating Pressure | 1,000 p.s.i. | |
|     Design Pressure | 2,000 p.s.i. | |
|     Operating Temperature | 285° C. (545° F.) | |
|     Construction | 347 stainless 6 in. schedule 120 pipe. | |
|     Volume of Vapor Space | 0.364 cu. ft. | |
|     Heat Input Capacity | 10 kw. | |
|     Steam Pressure to Pressurizer | 1500 p.s.i. | |
|   D. Gas Separator and Recombiner— | | |
|     Rate of Gas Evolution ($H_2+O_2$) (saturated) (1,000 p.s.i., 250° C.) | 80 cc./sec. Maximum | 400 cc./sec. Maximum. |
|     Heat of Recombination | 12 kw. Maximum | 58 kw. Maximum. |
|     Percent of Core Volume as Gas | 0.08 | 0.4. |
|     Bubble Residence Time in Core (secs.) | ½ | ½. |
| Reflector Recirculating System: | | |
|   A. Recirculation— | | |
|     Flow Rate | 26 g.p.m. | |
|     Type Pump | Canned Armature Centrifugal Pump. | |
|     Materials of Pump | Stainless steel | |
|     Head at 30 g.p.m. | 83 ft. of water (36 p.s.i. at 100° C.) | |
|     Efficiency | 40% | |
|     Required Power | 3.7 to 4.6 kw. | |
|     Cooling Oil Requirements | 10 g.p.m. @ 3–5 p.s.i. | |
|     Residence Time in Reflector | 240 sec. (reflector full) | |
|     Residence Time, External Circuit | 15 sec. | |
|     External Hold-up | 25 liter | |
|       Piping | 1.5 to 3 liters | |
|       Pump | 1 liter | |
|       Heat Exchanger | 20 liters | |
|     Sizes of Piping | 1 in., Schedule 40, 347 stainless steel. | |
|     Velocity in Piping | 11.6 ft./sec. | |
|   B. Deuterium Oxide Heat Exchanger | 200 kw. Level | 1,000 kw. Level. |
|     Heat Load | 60–75 kw. | 132 kw. |
|     Temperature in Reflector | 150° C., min. | 150° C., min. |
|     Temperature Boiler Feed Water In | 101° F. | 101° F. |
|     Pressure, $D_2O$ Side | Entering: 1,051 p.s.i. / Leaving: 1,020 p.s.i. | Entering: 1,051 p.s.i. Leaving: 1,020 p.s.i. |
|     Pressure, Water Side | 500 p.s.i.a. | 220 p.s.i.a. |
|     Type of Heat Exchanger | Double Pipe, Stainless steel | |
|     Area | 56 sq. ft. | |
|     Overall Heat Transfer Coefficient | 280 B.t.u./hr. ft.², ° F. | |
|     Pressure Drop, $D_2O$ | 41.2 p.s.i. | |
| Power Cycle: | | |
|   Flow Rate Boiler Feed Water | 1.2 g.p.m. | 6 g.p.m. |
|   Steam | 600 lb./hr. | 3,025 lb./hr. |
|   Head | 315 p.s.i.a. | 200 p.s.i.a. |

TABLE III—Continued

| Percentage of Design Point Reactor Operational Power Rate | 20% | 100% |
|---|---|---|
| Power Cycle:—Continued | | |
| Turbine-generator Rating | | 250 kw. |
| Boiler Feed Water Pump Power | 5 H.P. | 5 H.P. |
| Type Boiler Feed Water Pump | Parallel Combination—electric powered piston pump, and turbine pump | |
| Turbine Condenser Load | 500,000 B.t.u./hr | 3,000,000 B.t.u./hr. |
| Turbine Condenser Operating Pressure (design) | 2 in. Hg | |
| Turbine Condenser Water In | 70° F. | |
| Turbine Condenser Water Out | 90° F. | |
| Turbine Condenser Water Flow | 100–300 g.p.m | 300–600 g.p.m. |
| Turbine Condensate Temperature | | 101° F. |
| Turbine Condenser Water Main Size | 5 in. | |
| Turbine Condenser Steam Main Size | 4 in., schedule 60 | |
| Dump System and Storage System: | | |
| A. Uranium Solution Storage System— | | |
| Total Volume of Storage Tanks | 268 liters | |
| Configuration of Storage Tanks | 2 std., 8 in. stainless pipes on 21 in. + centers, in parallel. | |
| Total Length of Pipe | 25 ft. 6 in | |
| Types of Uranium Solution Pressure-Letdown Throttling Valve. | Diaphragm-actuated ⅛ in. valve. | |
| Time for Emergency Dumping | 1 min | |
| Design Pressure of Storage Tanks | 1,500 p.s.i | |
| Operating Pressure of Storage Tanks | 23 p.s.i | |
| Evaporator: | | |
| Type | Natural Convection, Double Pipe. | |
| Rate of Evaporation | 130 lb./hr. using 60 p.s.i.g. steam. | |
| Condensate Tanks: | | |
| Construction | 8 in. schedule 40 347 stainless pipe. | |
| Total Volume | 153 liters | |
| Uranium Solution Diaphragm Pump | Diaphragm with multiple check valves above and below. | |
| Head | 1,000 p.s.i | |
| Flow Rate | 1.15 g.p.m | |
| Suction Pressure | 5 ft. $H_2O$ | |
| Load | 5 H.P | |
| Economizer Heat Exchanger: | | |
| Type | Coil Tube, and Shell | |
| Flow Rate | 1 g.p.m | |
| Rate of Heat Removal | 10,000 B.t.u./hr | |
| Condenser: | | |
| Cooling Water Flow | 5 g.p.m | |
| Area | 27 sq. ft. | |
| Overall Heat Transfer Coeff | 85 B.t.u./hr. ft.$^2$ ° F | |
| Maximum Heat Load | 150,000 B.t.u./hr | |
| Required Head, Water | 10 ft | |
| Size Water Main | 2 in. pipe | |
| Temperature Cooling Water | 80° F | |
| Temperature Vapor Side | 194° F | |
| B. Reflector Dump and Storage Systems— | | |
| Total Volume | 166 gals | |
| Configuration of Deuterium Oxide Storage Tanks | 63 ft., 4 in. of 8 in. schedule 40 347 stainless pipe on 21 in. + centers. | |
| Pressure Vessel Discharge Pipe | 4 in | |
| Size $D_2O$ Pressure-letdown Throttling Valve | ⅛ in | |
| Design Pressure of $D_2O$ Storage tanks | 970 p.s.i | |
| Operating Pressure of $D_2O$ Storage Tanks | 15 p.s.i. abs | |
| Time of Dumping, 1,000 p.s.i. | 10–30 sec | |
| Deuterium Oxide Diaphragm Pump | Diaphragm pump with multiple check valves above and below. | |
| Head | 1,000 p.s.i | |
| Flow Rate | 2 g.p.m | |
| Shield: | | |
| Composition | Structural concrete, comprising Portland cement, barytes as aggregate, together with colemanite to provide 1% boron by weight and water. | |
| Thickness | 7 ft | |
| Controls: | | |
| Number of Regulating Plates | 1 | |
| Δ $k_{eff}/k_{eff}$ of Regulating Plates | 0.42% | |
| Number of Safety Plates Fixtures | 2 | |
| $k_{eff}/k_{eff}$ of each Safety Plates Fixtures | 0.61% | |
| Weight of each Plate | 30 lbs | |
| Length of travel | 18 in | |
| $k_{eff}/k_{eff}$ of reflector between Full and Empty | 6½–8% | |
| Time to fill Reflector (min.) | 120 | |
| Method of level control | Automatic and also Manual remote. | |
| Temperature Coefficient of $k_{eff}$ at 250° C. Free flow from Core. | −0.17% ° C | |
| Minimum time for complete withdrawal of plates | 120 seconds | |

| Neutron Flux (approximated): | Flux Neutrons/cm.$^2$ sec. | | | |
|---|---|---|---|---|
| | 200 kw. Level | | 1,000 kw. Level | |
| | thermal | epithermal | thermal | epithermal |
| Location— | | | | |
| Core | 4×10$^{12}$ | 7×10$^{12}$ | 1.9×10$^{13}$ | 3.7×10$^{13}$ |
| Reflector (inner edge) | 2×10$^{12}$ | 5×10$^{12}$ | 9×10$^{12}$ | 2.3×10$^{13}$ |
| Reflector (outer edge) | 1.4×10$^{11}$ | 8×10$^{10}$ | 7×10$^{11}$ | 4×10$^{11}$ |
| Total Neutrons | 1.5×10$^{16}$ | neut./sec. | 7.5×10$^{16}$ | neut./sec. |

| Fission Products—1,000 kw. operation: | | |
|---|---|---|
| Equilibrium total quantity of fission products | ca. 2×10$^5$ curies. | |
| Rate of formation of gaseous fission products | ca. 1.5 cc./hr., STP. | |
| Equilibrium absorber content | ca. 5×10$^5$ curies. | |
| Xenon-135 stripping, 40 cc./sec. $H_2+O_2$ @ (200 kw.) | ca. 99+ percent. | |
| Xenon-135 stripping, 0.4 cc./sec. $H_2+O_2$ | ca. 95%. | |
| Xenon-135 removal, equilibrium, 22.4 l vapor space | ca. 96%. | |
| $U^{235}$ Consumption = weight fission products | ca. 1 g./day. | |

*"Schedule" is employed, in customary manner, for conventional definition of the dimensions, weights, and sizes of steel pipe in accordance with the accepted A.S.A. Standard B-36.10–1939, American Standards Association, New York, N.Y. (cf. Chemical Engineer's Handbook, edited by J. H. Perry, third edition, pages 413–416 et seq., McGraw-Hill, 1950).

Although this invention has, until this point been described, with an express restriction, in the interest of initial clarity, that the volume of the amassment shall be substantially constant inherently it is not necessarily so limited. That is, in a chain-reactive system, the degree of reactivity is dependent not only upon the composition of the amassed medium, but also upon the volume of the amassment; changes in either the geometric configuration or cubic content of the volume generally tend to alter reactivity. Accordingly, for dependable control of reactivity through regulating solution molality by the present method, the fundamental requirement is, in its broadest sense, that such other parameter—volume—shall not be free to vary independently at the same time; otherwise, of course, the simultaneous meanderings of volume could wholly nullify or override the desired changes in reactivity attempted to be effected. Simply imposing the restriction that the volume be a fixed constant almost invariably proves to be the most feasible manner—and for most cases the only practical one—of satisfying this requirement. Nevertheless, the instant molality regulation will still be operative and effective in serving to regulate reactivity even if volume is permitted to vary, so long as such variation in volume is made sufficiently dependent upon the variation in solution molality that changes in reactivity stemming from molality changes are not cancelled or overridden by changes in volume. More quantitatively, degree of reactivity of a chain-fission reactive system is basically dependent upon the ratio of two characteristic expressions; one being the "material buckling" ($Bm^2$), and the other the "geometric buckling" ($Bg^2$). The "material buckling" is a specific property of the neutron multiplying medium of which the chain-reactive amassment is constituted, and its value is determined by the material and composition of the medium. Quantitatively, the value of $Bm^2$ is derived by solving, for $Bm^2$, the critical equation for a bare, homogeneous reactor:

$$\frac{ke^{-Bm^2\tau}}{1+L^2Bm^2}=1$$

In this equation the variables other than $Bm^2$ are definitive of the neutron-multiplying material:

$k$=multiplication factor=$fp\eta\epsilon$
$f$=thermal utilization factor—fraction of all thermal neutron captures taking place in fissionable isotope $$=\frac{N_f\sigma_f}{N_f\sigma_f+\Sigma_c(N_c\sigma_c)}$$

$N_f$=nuclei of fissionable isotope per cc.
$\sigma_f$=microscopic capture cross-section of fissionable isotope
$N_c$=nuclei of a given non-fissionable isotope per cc.
$\sigma_c$=microscopic capture cross-section of that nonfissionable isotope
$\Sigma_c$=summation including all non-fissionable isotopes
$p$=probability of neutron escaping resonance capture primarily in $U^{238}$ (depends primarily upon relative amount and distribution of $U^{238}$ present)
$\eta$=average number of new neutrons released upon each neutron captured in the fissionable isotope
$\epsilon$=fast fission factor=ratio of neutrons due to fissions caused by neutrons of all energies to those caused by neutrons of thermal energy (dependent primarily upon identity, proportionation, and relative distribution of fissionable isotope and moderator)
$\tau$=Fermi age=$L_f^2$
$L_f$=slowing-down length $$=\left(\frac{\ln E_{fiss}/E_{th}}{3[\Sigma_s(N_s\sigma_s)][\Sigma_s(N_s\sigma_s\xi)]}\right)^{1/2}$$

$E_{fiss}$=energy of neutron emitted by fission
$E_{th}$=neutron energy at thermal equilibrium
$N_s$=nuclei of a given isotope in amassment per cc.
$\sigma_s$=microscopic scattering cross-section of that isotope
$\xi$=mean logarithmic energy loss of a neutron upon collision with a nuclei of that isotope
$E_s$=summation including all isotopes in the core
$L$=neutron diffusion length $$=\left(\frac{1}{3[\Sigma_s(N_s\sigma_s)][N_f\sigma_f+\Sigma_c(N_c\sigma_c)]}\right)^{1/2}$$

The "geometric buckling" is a property of the geometric configuration and cubic content of the chain-reactive volume, and is independent of the constitution of the particular neutron-multiplying medium of which it is composed. For a spherical amassment, for example:

$$Bg^2=\left(\frac{\pi}{R}\right)^2$$

where:

$R$=radius of the sphere

Similarly, for a right cylindrical amassment:

$$Bg^2=\frac{(2.404S)^2+\left(\pi\frac{R}{l}\right)^2}{R^2}$$

where:

$\frac{R}{l}$=radius-to-length ratio of the cylinder

The degree of reactivity of the amassment depends upon the ratio of $Bm^2$ to $Bg^2$. When $Bm^2=Bg^2$, the amassment will be just critical; at any time that the ratio is greater than 1, the amassment will be supercritical, and at any time that the ratio is less than 1 the amassment will be subcritical. (For further details as to these aspects of reactor theory, reference may be made to:

The Elements of Nuclear Reactor Theory by S. Glasstone and M. C. Edlund, Van Nostrand, 1952;
The Science and Engineering of Nuclear Powder, vols. 1 and 2, edited by C. Goodman, Addison-Wesley, 1947–1949 (especially vol. 1, pp. 87–186, et seq.)).

It may be appreciated that change in solution molality, per se, affects only $Bm^2$, while change in volume, per se, affects only $Bg^2$. Therefore, for operability of the present method if volume is permitted to vary with variation in molality at all, its resulting effect upon $Bg^2$ must be so related to the effect that the change in molality tends to have upon $Bm^2$ that the ratio of $Bm^2:Bg^2$ will monotonically tend to be altered in one direction upon any and every increase in molality and tend to be altered in the opposite direction upon any and every decrease in molality. This desired relative effect is readily achieved in practice, for instance, by merely adopting a dependent variation of volume which always alters $Bg^2$ in the opposite direction from the direction in which the molality change, per se, tends to alter $Bm^2$; in this manner the alteration in $Bg^2$ tends to consistently accentuate the alteration in the $Bm^2:Bg^2$ ratio and hence in reactivity promoted by the alteration in molality, rather than nullifying or overriding the same. For example, in a simple substantially-thermal reactor arrangement where the liquid in the amassment only partially filling a large container represents the entirety of fuel-moderant solution in the system other than that of preferentially removed fissionable material being continuously retained apart, in accordance with the present method, any further decrease in molality, toward decreasing $Bm^2$, by further preferential removal of fissionable material will naturally serve to decrease the volume of amassment in the container, serving to increase $Bg^2$; likewise, release of fissionable material into the container toward increasing $Bm^2$ will serve to increase volume, serving to decrease $Bg^2$. In the opposite case, relationships wherein $Bg^2$ and $Bm^2$ both vary in the same direction are suitable if the resulting change in $Bg^2$ is consistently substantially smaller than, or consistently substantially larger than, the concomitant tendency of change in $Bm^2$; in either event, the buckling consistently sustaining the larger change would dominate the resulting variation of $Bm^2:Bg^2$ ratio and of reactivity. Conducting the instant molality variation method under conditions of such restricted variation of volume with molality is a natural extension of, and in further accordance with, the present invention.

Furthermore, although this invention has also been described with particular emphasis upon the rather highly developed specific reactor design, suitable for practical application, outlined in the drawings, it is inherently susceptible to wide variation. For example, while utilization of a single tangential inlet to sustain the vortex has been stressed, in higher-power operation use of a plurality of tangentially inlets, say four, symmetrically spaced around the equator, and associated with a pair of outlets, one at each pole, would be advantageous. Too, for projected operation within the 100,000–250,000 kw. power-production range, where core tank diameters of 6 to 9 feet would be required, deuterium oxide displaces natural water with respect to preferability as the liquid moderant; there with quite large core sizes, the importance of shortness of slowing down lengths of the moderant recedes, whereupon deuterium oxide's greater value of moderant microscopic efficiency $$\frac{\xi \sigma_s}{\sigma_a}$$

assumes primary significance. Moreover, while application of the present method to reactors employing fluid fuel-moderant in true solution form has been stressed, applicability extends to other substantially-homogeneous liquid systems, such as conventional slurry systems wherein fissionable material in a comminuted solid form is uniformly dispersed and suspended throughout a liquid moderant; it is gravimetric or molar ratio of fissionable-material-to-moderant, the counterpart of solution molality there, that is regulated in the instant manner. In addition, while operation with isotopically impure fissionable material, such as $U^{235}$ accompanied by $U^{238}$ is often advantageous in that $U^{238}$ becomes transmuted under the neutron bombardment to Pu–239, thereby generating new fissionable material, nevertheless other advantages such as achieving minimum reactor size and weight is afforded by operation with a completely isotopically isolated fissionable isotope—such as isotopically pure $U^{235}$—whereupon no such transmutation to Pu–239 will obtain. On the other hand, the present system is readily adapted to extensive production of new fissionable material during operation, by merely enlarging the reactor core and incorporating a fertile material, such as natural thorium (Th–232) in the reflector; thereupon, the high neutron flux transmutes the Th–232 to Th–233, which forthwith spontaneously decays, through Pa–233, to fissionable $U^{233}$, which may be continuously recovered during operation. Other variations and applications of the hereinbefore-disclosed method and means will become apparent to those skilled in the art. It is, therefore, to be understood that all matters contained in the above description and example are illustrative only, and do not limit the scope to the present invention.

What is claimed is:

1. For continuously controlling the rate of fission in a neutronic reactor during operation thereof, said reactor comprising, as its principal chain fission reacting medium, a substantially homogeneous liquid composed essentially of a fissionable material dissolved in a liquid moderator-solvent selected from the group consisting of water and deuterium oxide, disposed in a substantially volumetrically-constant amassment and adapted to engage, while so disposed, in spontaneous, self-sustaining chain fission reaction, a new and improved method which comprises circulating said liquid as a contantly-flowing stream through a continuous closed path and at one point in said path passing the liquid through such state of amassment, at another point in said path continuously retaining apart from the circulating liquid a variable proportion of the total amount of one of its original constituents selected from the group consisting of its fissionable material and its moderator-solvent, removed from the circulating liquid substantially preferentially with respect to the unselected other said constituent, and varying during the operation of said reactor said variable proportion of preferentially-retained constitutent, thereby varying the concentration of mass of fissionable material per unit mass of moderator-solvent in said circulating liquid, and consequently thereby serving to adjust the reactivity of the amassment to a different value.

2. The method of claim 1 wherein said substantially homogeneous liquid is an aqueous solution of fissionable material.

3. The method of claim 1 wherein said substantially homogeneous liquid is an aqueous solution of an inorganic salt of uranium.

4. The method of claim 1 wherein said substantially homogeneous liquid is an aqueous solution of uranyl sulfate, the uranium constituent of which is highly isotopically enriched in uranium-235.

5. For continuously controlling the rate of fission in a neutronic reactor during operation thereof, said reactor comprising, as its principal chain fission reacting medium, a substantially homogeneous liquid solution of fissionable material dissolved in a liquid moderant, said fissionable material and said moderant having substantially different vapor pressures at the same temperatures, disposed in a substantially volumetrically-constant amassment, and adapted to engage, while so disposed, in spontaneous, self-sustaining chain fission reaction, a new and improved method which comprises: circulating said liquid as a constantly-flowing stream through a continuous closed path and at one point in said path passing a liquid through such state of amassment; at another point in said path continuously retaining apart from the circulating liquid a variable proportion of the total amount of the one of its original constituents, as between the fissionable material and the moderant, having the higher vapor pressure, removed from circulating solution substantially preferentially, with respect to the other said constituent of lower vapor pressure, by partial distillation of the solution; and varying during the operation of said reactor said variable proportion of preferentially-retained constituent, thereby varying the molal concentration of fissionable material in said circulating solution, and consequently thereby serving to adjust the reactivity of the amassment to a different value.

6. The method of claim 5 wherein said substantially homogeneous liquid solution of fissionable material dissolved in a liquid moderant is an aqueous solution of an inorganic salt of a fissionable material, and wherein said constituent substantially preferentially removed from the circulating liquid by partial distillation is the solvent, water, of the solution.

7. For continuously controlling the rate of fission in a neutronic reactor during operation thereof, said reactor comprising, as its principal chain fission reacting medium, a substantially homogeneous liquid solution of fissionable material dissolved in a liquid neutron moderant, disposed in a substantially volumetrically-constant amassment and adapted to engage, while so disposed, in spontaneous, self-sustaining chain fission reaction, a new and improved method which comprises circulating said solution as a constantly-flowing stream through a continuous closed path and at one point in said path passing the solution through such state of amassment, at another point in said path continuously retaining apart from the circulating liquid a variable proportion of the total amount of one of its original constituents selected from the group consisting of its fissionable material and its moderant, removed from the circulating liquid substantially preferentially with respect to the unselected other said constituent by preferential extraction of the same into a liquid solvent substantially immiscible with said solution, and varying during the operating of said reactor said variable proportion of preferentially-retained constituent, thereby varying the molal concentration of fissionable material in said circulating solution, and consequently thereby serving to adjust the reactivity of the amassment to a different value.

8. For continuously controlling the rate of fission in a neutronic reactor during operation thereof, said reactor comprising, as its principal chain fission reacting medium, an aqueous solution of an inorganic salt of a fissionable material, disposed in a substantially volumetrically-constant amassment and adapted to engage, while so disposed, in spontaneous, self-sustaining chain fission reaction, a new and improved method which comprises: circulating said solution as a constantly-flowing stream through a continuous closed path; at one point in said path passing the solution through such state of amassment; at another point in said path continuously retaining apart from the circulating liquid as a separate accumulation, a variable proportion of the total amount of its aqueous solvent, removed from the circulating solution substantially preferentially with respect to the fissionable material by continuously partially distilling the circulating solution, diverting the stream of resulting aqueous distillate into said accumulation to maintain said continuously-retained variable proportion of aqueous solvent, and immediately returning all undiverted portions of the aqueous distillate back into said circulating solutions, said variable proportion of preferentially-retained aqueous solvent thereby being adapted to be increased by a diversion of further portions of said distillate stream into said accumulation, and adapted to be decreased by release of amounts of the accumulated distillate back into the circulating solution; and varying during the operation of said reactor said variable proportion of preferentially-retained aqueous solvent, thereby varying the molal concentration of fissionable material in said circulating solution, and consequently thereby serving to adjust the reactivity to a different value.

9. The method of claim 8 wherein said varying of the variable proportion of said preferentially-retained aqueous solvent is effected by automatic actuating means, responsive to radiation-determination instrumentation intimately exposed to the radiation emanated by the chain-reaction amassment, adapted to regulate the duration and extent of said diversion and duration and extent of said release.

10. The method of claim 1 wherein said substantially homogeneous liquid the molal ratio of said moderator solvent to fissionable isotope in the solution maintained within the range of 250:1 to 1,000:1.

11. The method of claim 8 wherein said aqueous solution of fissionable material is an aqueous solution of uranyl sulfate, the uranium constitutent of which is highly isotopically enriched in uranium-235, maintained at ca. 250° C. temperature and ca. 1,000 p.s.i. pressure, wherein said substantially volumetrically-constant amassment is of substantially spherical configuration of ca. 1½ feet diameter.

12. The method of claim 1 wherein said amassment is surrounded by a body of liquid neutron reflectant, the presence of which is essential to the self-sustenance of a chain fission reaction in the amassment, rapidly drainable to afford expeditious termination of the chain reaction.

13. The method of claim 1 wherein said amassment is surrounded by a body of liquid deuterium oxide as a neutron reflectant, the presence of which is essential to the self-sustenance of a chain fission reaction in the amassment, rapidly drainable to afford expeditious termination of the chain reaction.

14. The method of claim 1 wherein said amassment is surrounded by a body of liquid neutron reflectant, the presence of which is essential to the self-sustenance of a chain fission reaction in the amassment, rapidly drainable to afford expeditious termination of the chain reaction, and wherein at least one mass of a strong neutron absorber is provided and adapted to be instantaneously introduced into said body of liquid neutron reflectant in close proximity of said amassment thereby to afford immediate radical reduction of the reactivity of the chain-reactive amassment.

15. The method of claim 1 wherein said liquid in said amassment is maintained contiguous with a body of the same liquid in an expansion reservoir means external said amassment, said reservoir means being adapted to afford direct and substantially unimpeded egress from said amassment of excess liquid content upon thermal expansion of the solution in said amassment, and like ingress into said amassment of restitutory liquid upon thermal contraction of liquid in said amassment, thereby to render the chain-reactive amassment resistive of spurious deviations of reaction rate away from the desired level, and thus to afford a self-stabilization of the reaction.

16. The method of claim 1 wherein said substantially homogeneous liquid is an aqueous solution of uranyl sulfate, the uranium constituent of which is highly isotopically enriched in uranium-235, maintained at ca. 250° C. and ca. 1000 p.s.i. pressure, wherein said varied concentration of mass of fissionable material per unit mass moderant is the molal concentration of uranyl sulfate in the solution, and wherein said solution in said amassment is maintained contiguous with a body of the same solution in an expansion reservoir means external said amassment, said reservoir means being adapted to afford direct and substantially unimpeded egress from said amassment of excess liquid content upon thermal expansion of the solution in said amassment, and like ingress into said amassment of restitutory liquid upon thermal contraction of liquid in said amassment, thereby to render the chain-reactive amassment resistive to spurious deviations of reaction rate away from the desired level, and thus to afford a self-stabilization of the reaction.

17. In a neutronic reactor comprising, as its principal chain fission reacting medium, an aqueous solution of an inorganic salt of a fissionable material, adapted to be disposed in a substantially volumetrically-constant amassment and adapted to engage, while so disposed in spontaneous, self-sustaining chain fission reaction, integrated apparatus for improved operation of said fission reaction which comprises a closed container adapted to retain said chain-reactive amassment of said solution passing as a constantly-flowing stream therethrough, a continuous channel external said container forming a continuous closed liquid-retentive path including said container, a pump interposed in said channel adapted to maintain said solution constantly flowing as a stream through said path, a second container disposed apart from said path adapted to contain a variable proportion of the total amount of the solution's original aqueous solvent, a still interposed in said channel adapted to continuously partially distill preferentially from said solution constantly flowing through said channel a portion of its aqueous solvent, a liquid-conducting conduit associated with said still adapted to return immediately distillate produced by said still back into said channel, adjustable liquid-diversion means interposed in said conduit adapted to afford variable diversion of amounts of distillate, flowing through said conduit, into said second container, and an adjustably obstructable second liquid-conducting conduit adapted to afford variable release of amounts of distillate being retained in said second container back into said channel.

18. For continuously controlling the rate of fission in a neutronic reactor during operation thereof, said reactor comprising, as its principal chain fission reacting medium, a substantially homogeneous liquid solution of fissionable material dissolved in a liquid moderant, said fissionable material and said moderant having substantially different vapor pressures at the same temperatures, disposed in a substantially volumetrically-constant amassment, and adapted to engage, while so disposed, in spontaneous, self-sustaining chain fission reaction, a new and improved method which comprises: circulating said liquid as a constantly-flowing stream through a continuous closed path and at one point in said path passing said liquid through such state of amassment; at another point in said path continuously retaining apart from the circulating liquid a variable proportion of the total amount of the one of its original constituents, as between the fissionable material and the moderant, having the lower vapor pressure, removed from the circulating solution substantially preferentially, with respect to the other said constituent of higher vapor pressure, by partial distillation of the solution and separate recovery of the resulting distilland; and varying during the operation of said reactor said variable proportion of preferentially-retained constituent, thereby varying the molal concentration of fissionable material in said circulating solution, and consequently thereby serving to adjust the reactivity of the amassment to a different value.

References Cited in the file of this patent

UNITED STATES PATENTS

| | | |
|---|---|---|
| 2,743,225 | Ohlinger et al. | Apr. 24, 1956 |
| 2,770,591 | Wigner et al. | Nov. 13, 1956 |
| 2,815,321 | Wigner et al. | Dec. 3, 1957 |
| 2,816,068 | Ruano | Dec. 10, 1957 |
| 2,820,753 | Miller et al. | Jan. 21, 1958 |
| 2,825,688 | Vernon | Mar. 4, 1958 |

FOREIGN PATENTS

| | | |
|---|---|---|
| 648,293 | Great Britain | Jan. 3, 1951 |
| 688,821 | Great Britain | Mar. 18, 1953 |

OTHER REFERENCES

U.S. Atomic Energy Commission AECD-3059, An Enriched Homogeneous Reactor, Jan. 25, 1951, pages 1-13.

Los Alamos Scientific Laboratory LA-1337 (contract with U.S. Atomic Energy Commission), Gas Recombination System of the Los Alamos Homogeneous Reactor, by M. E. Bunker et al., Mar. 6, 1952, pages 1-14.

U.S. Atomic Energy Commission AECD-3065, High Power Water Boiler, Sept. 19, 1945, Los Alamas Scientific Library, pages 7-22.

The Science and Eng. of Nuclear Power, by Clark Goodman, vol. I (1947), Addison-Wesley Press, Cambridge, Mass., pages 296-309.

U.S. Atomic Energy Commission ORO-33, Program Administration and Installation Design of the Nuclear Reactor Project at North Carolina State College, by C. K. Beck et al., July 5, 1950, pages 16-47.

UNITED STATES PATENT OFFICE

CERTIFICATION OF CORRECTION

Patent No. 2,938,844                         May 31, 1960

Clifton B. Graham et al.

It is hereby certified that error appears in the above numbered patent requiring correction and that the said Letters Patent should read as corrected below.

In the heading to the drawings, Sheets 1, 2, 3, 4 and 5, line 2, and in the heading to the printed specification, line 2, in the title of invention, for "COUNTER" read -- CONTROL --.

Signed and sealed this 25th day of April 1961.

(SEAL)
Attest:

ERNEST W. SWIDER
Attesting Officer

DAVID L. LADD
Commissioner of Patents